(12) United States Patent
Ludwig

(10) Patent No.: US 11,176,819 B2
(45) Date of Patent: Nov. 16, 2021

(54) SYSTEMS AND METHODS FOR ADAPTIVE PROTOCOL IMPLEMENTATION FOR VEHICLE HEAD UNITS

(71) Applicant: Xevo Inc., Bellevue, WA (US)

(72) Inventor: John Ludwig, Bellevue, WA (US)

(73) Assignee: XEVO INC., Bellevue, WA (US)

( * ) Notice: Subject to any disclaimer, the term of this patent is extended or adjusted under 35 U.S.C. 154(b) by 265 days.

(21) Appl. No.: 16/385,760

(22) Filed: Apr. 16, 2019

(65) Prior Publication Data
US 2020/0334980 A1    Oct. 22, 2020

(51) Int. Cl.
| | | |
|---|---|---|
| *G08G 1/00* | (2006.01) | |
| *G08G 1/16* | (2006.01) | |
| *H04W 4/46* | (2018.01) | |
| *G07C 5/00* | (2006.01) | |
| *G07C 5/08* | (2006.01) | |
| *G08G 1/09* | (2006.01) | |
| *G08G 1/0967* | (2006.01) | |
| *G08G 1/127* | (2006.01) | |

(52) U.S. Cl.
CPC ....... *G08G 1/096741* (2013.01); *G07C 5/008* (2013.01); *G07C 5/0841* (2013.01); *G08G 1/096775* (2013.01); *G08G 1/127* (2013.01); *H04W 4/46* (2018.02)

(58) Field of Classification Search
CPC ....... G08G 1/096741; G08G 1/096775; G08G 1/127; G08G 1/096716; G08G 1/09675; G08G 1/00; G08G 1/09; G08G 1/12; G08G 1/16; G07C 5/008; G07C 5/0841; G07C 5/00; G07C 5/08; H04W 4/46
See application file for complete search history.

(56) References Cited

U.S. PATENT DOCUMENTS

| | | | | |
|---|---|---|---|---|
| 6,028,537 | A  * | 2/2000 | Suman | B60K 35/00 |
| | | | | 340/988 |
| 6,792,351 | B2 | 9/2004 | Latter | |
| 8,326,469 | B2 * | 12/2012 | Phillips | G05D 1/0088 |
| | | | | 701/2 |
| 2007/0011704 | A1 | 1/2007 | Anglin, Jr. | |
| 2011/0060496 | A1 | 3/2011 | Nielsen et al. | |
| (Continued) | | | | |

OTHER PUBLICATIONS

PCT/US2019/63204—International Search Report and Written Opinion, dated Feb. 18, 2020, 14 pages.
(Continued)

*Primary Examiner* — Yonel Beaulieu
(74) *Attorney, Agent, or Firm* — Seed IP Law Group LLP

(57) ABSTRACT

Technologies are disclosed herein for selecting a content instance for enforcing a protocol on a head unit of a vehicle. The content instance corresponds to a geographic region of a vehicle and is received by the head unit in the geographic region. The content instance includes a set of criteria for determining whether to enforce the protocol. Enforcement of the protocol by the head unit may adjust operation of the head unit or how the head unit presents media content. The head unit may establish communication connections with head units of other vehicles. The head units may communicate vehicle specific information over the communication connections and implement protocols as a result of the communications.

21 Claims, 13 Drawing Sheets

(56) References Cited

U.S. PATENT DOCUMENTS

2016/0082839 A1* 3/2016 Ricci .................. H04N 21/2393
　　　　　　　　　　　　　　　　　　　　　　　　701/36
2016/0306615 A1　10/2016 Ricci
2017/0067747 A1* 3/2017 Ricci ..................... G06F 3/0673
2017/0371608 A1　12/2017 Wasserman

OTHER PUBLICATIONS

U.S. Appl. No. 16/210,207, filed Dec. 5, 2018, "Systems and Methods for Adaptive Content Filtering," inventor: John Ludwig.

* cited by examiner

SYSTEMS AND METHODS FOR ADAPTIVE PROTOCOL IMPLEMENTATION FOR VEHICLE HEAD UNITS

BACKGROUND

Technical Field

The present disclosure relates to selective presentation of content to a user of a vehicle.

Description of the Related Art

Some newer model vehicles are provided with a display unit, called a head unit, with which a user can interact to monitor and control various aspects of the vehicle. Using the head unit, users can control temperature settings for the vehicle interior, access maps showing the vehicle's location, and control playback of audio content through the vehicle's audio system. Some head units may be configured to perform certain operations, such as displaying navigation instructions or presenting media content in response to receiving user input to navigate to a specific destination or play music. However, these existing head units perform a fixed set of operations and cannot appropriately adapt according to the situation, limiting their functionality and flexibility.

For example, some head units may overlay traffic information regarding traffic conditions during navigation to a destination. This traffic information is typically obtained via GPS tracking of mobile devices, which exposes potentially sensitive information regarding user destinations. Users of the head unit may wish to protect personal information, vehicle information, or location information from being shared over a network with unauthorized third parties. Additionally, although such traffic information may be useful, this information does not reflect recent traffic events (e.g., accidents, sudden stops) or provide information specific to lanes or cars. Until now, the limited functionality and adaptability of head units has inhibited users and developers alike from being able to experience the potential advantages of head units.

BRIEF SUMMARY

Briefly stated, embodiments are directed toward enforcing, by head units of vehicles, protocols received in content instances for a particular geographic region. The content instances are transmitted by one or more antennae in a target geographical area. This target geographical area may be defined by zip code, city, county, particular antennae, or other geographical boundaries. In various embodiments, the geographical area is limited or defined by which antennae are transmitting the content and the transmission range of the transmitting antennae. The plurality of content instances, in at least some embodiments, includes visual content, audio content, audiovisual content, or other information related to locales within the target geographic area.

The head unit receives the content instance including the protocol and evaluates whether to enforce the protocol based on a set of criteria associated with the protocol. The head unit may obtain vehicle-specific information, stored in memory or obtained as a measurement regarding vehicle operations or events, and determine whether the vehicle-specific information satisfies the set of criteria. The set of criteria may include criteria relating to operation of the vehicle or conditions detected on or around the vehicle. In some embodiments, the set of criteria may include conditions regarding communications with head units of other vehicles.

Selection and enforcement of a protocol may cause the head units to perform or modify operation according to instructions specified in the protocol. Some protocols may cause the head unit to adjust presentation of media content via the head unit. The head unit may receive a plurality of content instances that include media content, and the head unit may adjust how the media content is displayed on a display of the head unit to provide targeted content while reducing driver distractions. Some protocols may cause the head unit to instruct the associated vehicle to operate differently for improving safety or performance based on conditions and events reported at locations in the geographic region.

A remote server may generate the content instance including a protocol and corresponding criteria. The remote server may cause the content instance to be transmitted to head units located in the geographic region. The protocol may cause head units enforcing the protocol to transmit information regarding vehicle operations and conditions detected back to the remote server. The remote server may then generate condition information indicating conditions at locations in the geographic region and cause the condition information to be transmitted to head units. The condition information may be useable by the head units to generate a map indicating locations having hazardous conditions or experiencing heavy vehicle traffic.

DETAILED DESCRIPTION

Figure 1:
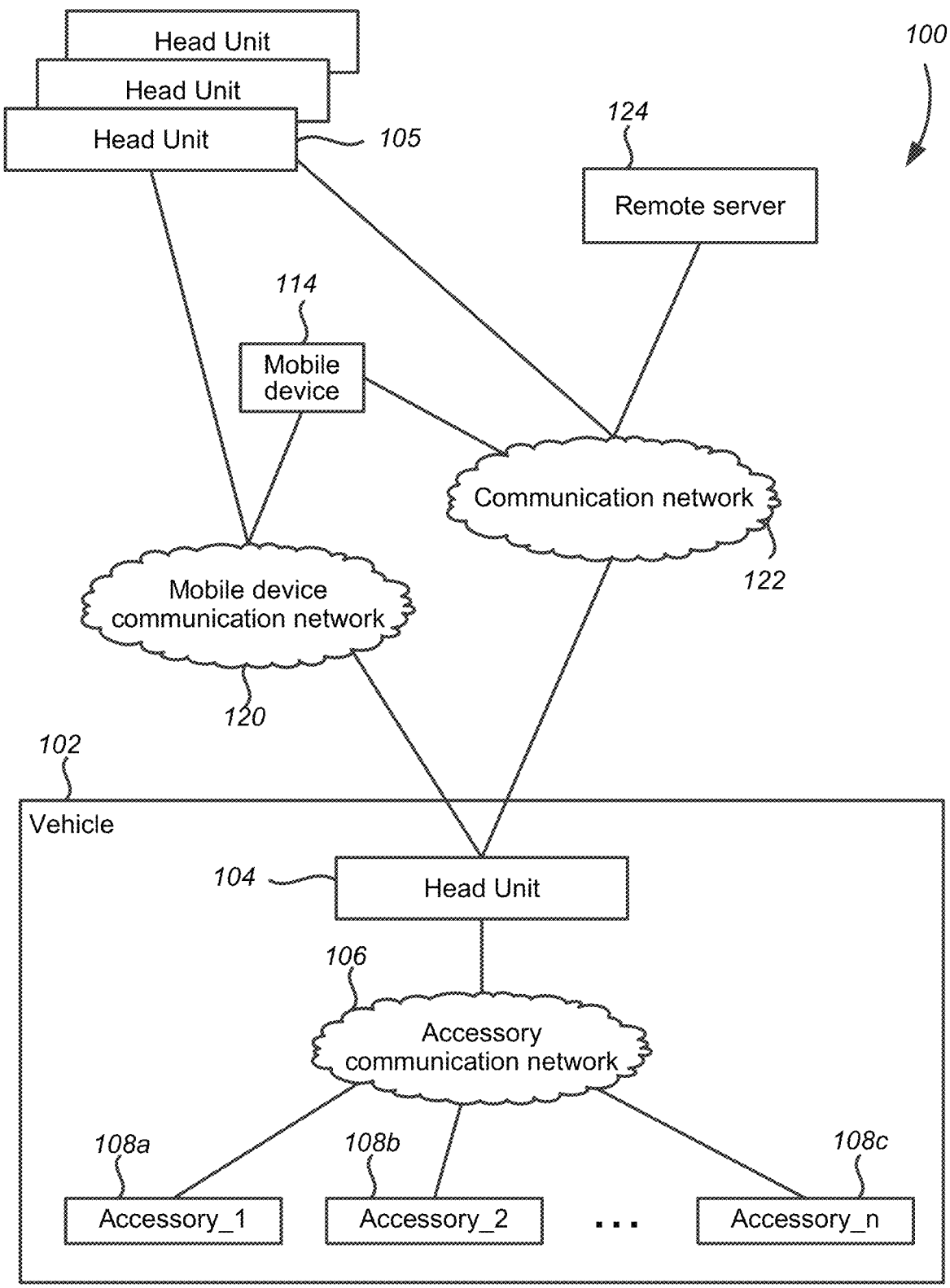
FIG. 1 illustrates a context diagram of a vehicle environment for selecting and presenting content on a head unit of the vehicle to a user in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including the communication systems and networks and the vehicle environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references. References to the term "set" (e.g., "a set of items"), as used herein, unless otherwise noted or contradicted by context, is to be construed as a nonempty collection comprising one or more members or instances.

The term "user" is defined as a person or occupant that is in or otherwise transported by a vehicle or in control of the vehicle, such as a driver or passenger of the vehicle. The term "vehicle" is defined as a device used to transport people or goods (or both), and examples include automobiles, buses, aircraft, boats, or trains. Although most of the following text focuses on an automobile, the application of the concepts described herein is not limited to such a vehicle. A "processor" is defined as a component with at least some circuitry or other hardware that can execute instructions. A "head unit" is defined as one or more components, whether part of a single unit or a collection of units, at least some of which include circuitry, configured to present content or cause it to be presented to a user. A "communication interface" is defined as a component with at least some circuitry and that is configured to facilitate, manage, control, or coordinate communications between a vehicle and another device.

The term "protocol" is defined as one or more predetermined instructions, procedures, operations, or settings to be selectively implemented. The term "implement" is defined as to execute, initiate, accomplish, follow, enforce, present, or give practical effect to. The term "ad hoc connection" is defined as connection that is part of a self-configuring network of devices communicating wirelessly without the assistance of network infrastructure, although some device of the network may be connected to the Internet or some other network with a fixed topology.

FIG. 1 illustrates a context diagram of a vehicle environment for selecting and presenting content on a head unit of the vehicle to a user in accordance with embodiments described herein. System 100 includes a vehicle 102 and a plurality of mobile devices 114.

The mobile device 114 may be any device capable of communicating with another mobile device or a head unit 104 of the vehicle 102. The mobile device 114 is structured to send and receive content and controls to and from the head unit 104 or other mobile devices. Examples of mobile devices 114 include laptop computers, smart phones, tablet computers, wearable computing devices, or other handheld computing devices.

The vehicle 102 is virtually any means of transportation that includes a head unit 104. Thus, embodiments described herein may be employed in automobiles, aerial vehicles, water vessels, railroad vehicles, and other modes of transportation that include a head unit.

The head unit 104 can be a computing device in a vehicle that provides interactive controls to a user or occupant of the vehicle. As used herein, the terms user and occupant are interchangeable and refer to any person interacting with the head unit 104, the vehicle 102, or any of the mobile devices 114. The head unit 104 is utilized to control one or more accessories 108*a*-108*c* or to receive information or data from one or more accessories 108*a*-108*c*. The head unit 104 can display the received information or data, or it can provide it to other devices, such as one or more of mobile devices 114.

The accessories 108*a*-108*c* can include any vehicle utility or device that is controllable by the user. Examples of these accessories include adjustable seats, a sun roof, side mirrors, a rear-view mirror, an air conditioner, power windows, or other controllable features of the vehicle 102. Accessories 108*a*-108*c* also include virtually any vehicle utility or device that provides information to the user. Examples of these accessories include a speedometer, an odometer, an oil pressure gauge, a temperature gauge, or other vehicle sensors that provide information to the vehicle or a user of the vehicle. Accessories 108*a*-108*c* further include applications executing on the head unit 104 that have two-way interaction with the user. Examples of these accessories include navigation, audio, and radio controls, television or music applications, environmental-control applications, vehicle-performance or maintenance applications, or other applications. It should be noted that some accessories may only output data or receive controls to manipulate the accessory, and some accessories may input and output data. For example, a speedometer may only output the current speed of the vehicle, a power window may only receive controls to move the window up or down (but not return any information to the head unit), and the navigation system may receive controls for a destination and also return a suggested travel route to the destination. It should be noted that these examples are non-exhaustive and other types of accessories may also be employed.

The head unit 104 communicates with the accessories 108a-108c via an accessory communication network 106. The accessory communication network 106 is configured to couple the accessories 108a-108c with the head unit 104 to exchange data (which may include content) among the accessories 108a-108c and the head unit 104. The information communicated between devices may include current accessory status or data, accessory control data, video data, voice data, image data, text data, or other types of data or information. The accessory communication network 106 may include one or more physical networks, wireless communication networks, application program interfaces, or other networks capable of transmitting data from one accessory to another or to the head unit 104 or from the head unit to an accessory or some combination thereof, depending on the types of accessories communicating with the head unit 104. For example, the accessory communication network 106 may include an automotive-body network (such as a wired controller area network), short-range wireless communication network (such as personal area networks utilizing classic Bluetooth or Bluetooth Low energy protocols), or any other type of network.

The head unit 104 communicates with the mobile device 114 via a mobile device communication network 120. The mobile device communication network 120 is configured to couple the mobile device 114 with the head unit 104 to exchange data (including content) between the mobile device 114 and the head unit 104. The information communicated between devices may include current accessory status or data, requests to access accessory data, requests to control or modify an accessory, video data, voice data, image data, text data, or other types of data or information. The mobile device communication network 120 may include a variety of short-range wireless communication networks, such as personal area networks utilizing classic Bluetooth or Bluetooth Low energy protocols, an IR optical network, or network 120, to enable communication between the mobile device 114 and the head unit 104. In this arrangement, the mobile device 114 may exchange signals directly with the head unit 104 without the assistance of a long-range wireless network. Because the mobile device 114 may communicate with other networks, such as cellular or Wi-Fi networks, the mobile device 114 may serve as a connection point to these networks for the head unit 104.

In other cases, the head unit 104 may be equipped with an embedded modem to enable the head unit 104 to exchange signals with these networks without requiring the assistance of the mobile device 114 to do so. In this example, however, the mobile device 114 may continue to be paired with the head unit 104 through the mobile device communication network 120.

The head unit 104 may communicate with one or more head units 105 of other vehicles via the mobile device communication network 120 or the communication network 122. In some embodiments, the head unit 104 and the head unit(s) 105 of the other vehicles may establish ad hoc networks external, or in addition, to the mobile device communication network 120 and/or the communication network 122.

In various embodiments, the mobile device communication network 120 and the accessory communication network 106 are separate communication networks. In some embodiments, the mobile device 114 may not be able to connect to and communicate directly with the accessories 108a-108c.

In such cases, the head unit 104 can act as a gateway or bridge between the mobile device 114 and the accessories 108a-108c. In some embodiments, the head unit 104 provides various authentication and verification technologies for permitting or restricting the transfer of accessory data to the mobile device 114 or enabling the mobile device 114 to control an accessory 108a-108c.

In one alternative, the head unit 104 is not a permission unit between the mobile device 114 and the accessories 108a-108c. For example, a network that connects the mobile device 114 directly to an accessory 108a-108c and the head unit 104 may grant permission for communication to occur between the mobile device and the accessory but is not otherwise involved in the communication itself. The head unit 104 can provide various functions, including connection handling, data binding, data broadcasting, data marshalling, or other data control techniques or functionality.

In some embodiments, the head unit 104 communicates with a remote server 124 via a communication network 122. The remote server 124 may store or maintain content instances. As described herein, in some embodiments, the information received by the head unit 104 may include a reference to the content instances, such as a URL. Accordingly, the head unit 104 can request specific content instances from the remote server 124 via communication network 122, and the remote server 124 can respond with the requested content instances.

Figure 2:
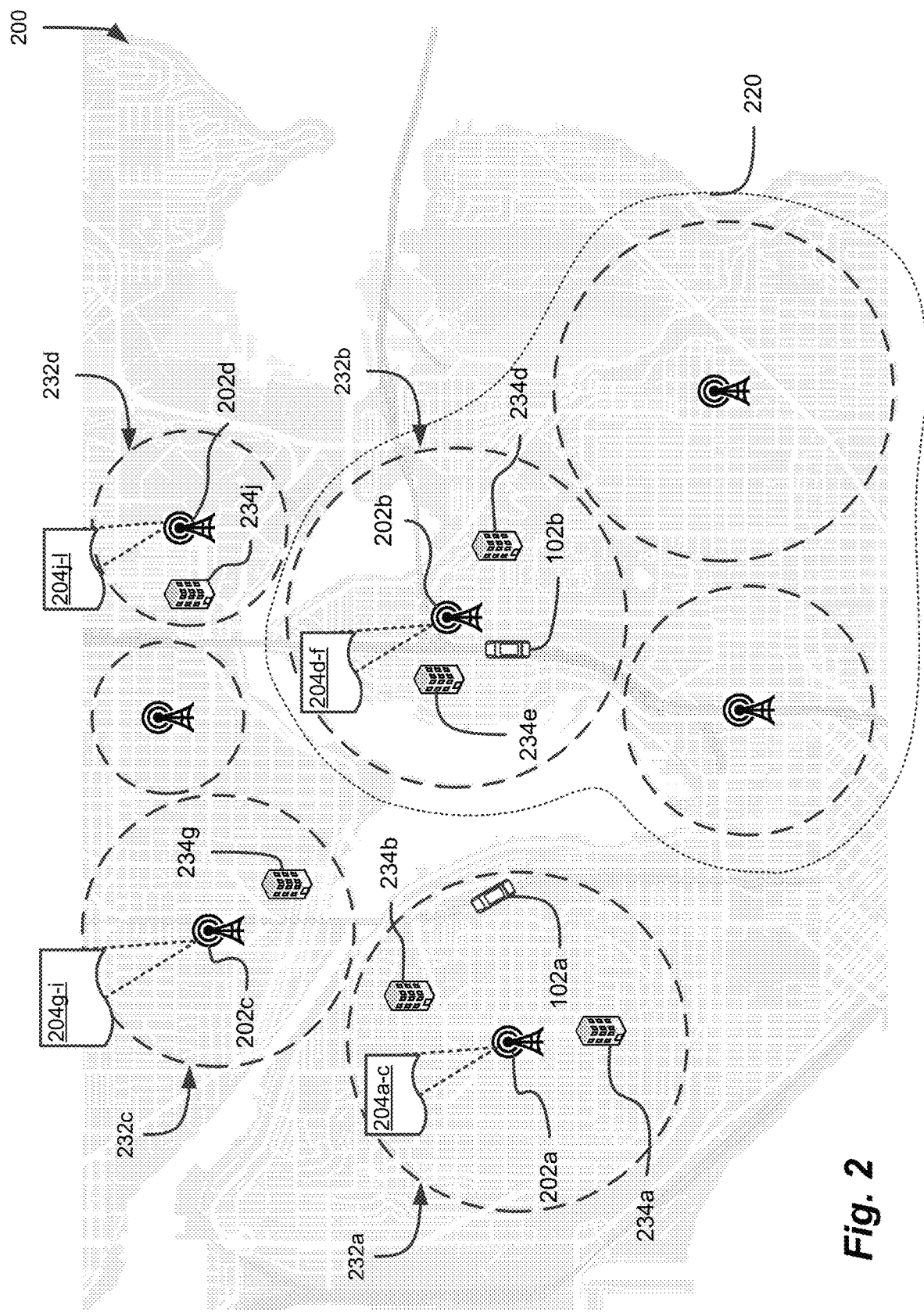
FIG. 2 illustrates an environment in which a plurality of antennae transmit a plurality of content instances to transmission regions in accordance with embodiments described herein.

FIG. 2 illustrates an environment 200 in which a plurality of antennae 202 respectively transmit a plurality of content instances 204. The term "content instance" is defined as a collection of computer-storable objects organized into a group. Examples of computer-storable objects include data objects (such as media files containing audiovisual content), executable objects (such as scripts or programs), or sets of logic that dictate an output for given input. The plurality of content instances 204 are received by vehicles 102 travelling in a corresponding transmission region 232. The vehicles 102 are equipped with a head unit 104 that can selectively present the plurality of content instances 204.

Each of the plurality of antennae 202 transmits a plurality of content instances 204 approximately within a corresponding transmission region 232. For example, first antenna 202a transmits a first plurality of content instances 204a-204c within a first region 232a, a second antenna 202b transmits a second plurality of content instances 204d-204f within a second region 232b, a third antenna 202c transmits a third plurality of content instances 204g-204i within a third region 232c, a fourth antenna 202d transmits a fourth plurality of content instances 204j-204l within a fourth region 232d, and so forth. As a result, a first vehicle 102a located in the first transmission region 232a can receive the first plurality of content instances 204a-204c, which may or may not be different than the second plurality of content instances 204d-204f received by a second vehicle 102b located in the second transmission region 232b.

As an example, each of the content instances 204 includes or corresponds to content that may be different than the content of the other content instances within the same transmission region and may be different than the content instances of other transmission regions. For example, the content instance 204a corresponds to content different from the content instances 204b and 204c within the first region 232a, and the content instance 204a corresponds to content different from the content of content instances within another region 232.

A transmission region 232 for a first plurality of content instances 204 may be different from a transmission region 232 for a second plurality of content instances 204. In some embodiments, the content instances 204a-204c may be transmitted in a transmission region 232a that has a larger coverage area than the area of the transmission region 232d of the content instance 204j-204l. Although only a single antenna 202 is depicted as transmitting a corresponding plurality of content instances 204 (i.e., each antenna 202 transmits separate content instances 204), a plurality of antennae 202 may also be used to transmit the same content instances 204. A plurality of antennae 202b, for example, may transmit the plurality of content instances 204d-204f within a target geographic area 220, which may be defined by zip code, city, neighborhood, antenna select and transmission ranges, or the like, or some combination thereof.

The antennae 202 may be of varying types and power and may cover different sizes of geographic regions. Individual antennas 202 may be configured to transmit to or within zip codes, neighborhoods, statistical areas (e.g., primary statistical areas, core based statistical areas, metropolitan statistical areas), etc. In some embodiments, a plurality of smaller antennae 202, such as network routers or cellular routers, may be distributed throughout a geographic region to comprise a transmission region 232, such as illustrated by geographic area 220. A transmission region 232 may include a plurality of different types of antennae 202 transmitting the plurality of content instances 202.

At least some content instances 204 may correspond to locations 234 within the respective transmission regions 232. The locations 234 may be commercial establishments that wish to promote awareness of their existence, location, or services or goods offered. A first content instance 204a transmitted within the first region 232a may correspond to a first location 234a within the first region 232a. As another example, a second content instance 204b may include content representative of a second location 234b within the first region 232a. Some individual content instances 204 may include content representative of the corresponding location—for example, content representative of a name and/or specific geographic location (e.g., street address, coordinates) within the region 232. Some individual content instances may include content representative of the goods and/or services offered at the location.

Other content instances 204 may correspond to establishments located outside the transmission regions 232, or at least the transmission region 232 in which the vehicle 102 is currently positioned. For example, an organization may want to deliver content instances 204 on a regional, national, or multinational basis. In such a scheme, similar content instances 204 related to the organization may be disseminated throughout multiple transmissions regions 232—at the same time or at different intervals—across various geographic areas. In some cases, these content instances 204 may be identical or substantially similar. In other embodiments, the content instances 204 may differ in significant respects, and these differences may be based on the culture or norms of the various locations supporting the transmission regions 232.

As a vehicle 102 transitions from one transmission region to another transmission region, the vehicle 102 may begin receiving a different plurality of content instances for that new transmission region. As an example, the first vehicle 102a travelling in the first transmission region 232a that transitions to the third transmission region 232c may begin receiving the third plurality of content instances 204g-204i and stop receiving the first plurality of content instances 204a-204c. The third plurality of content instances 204g-204i received by the first vehicle 102a may include content corresponding to a location 234g in the third transmission region 232c, which was not transmitted in the first transmission region 232a. Although each transmission region 232 of the environment 300 may be distinct from the other transmission regions, parts of adjacent transmission regions may overlap in some embodiments. Furthermore, the head unit 104 of each vehicle 102 may receive the plurality of content instances 204 without requesting the plurality of content instances 204 and without transmitting any notification regarding the location of the vehicle 102. As described herein, the head units 104 of each vehicle 102 determine which, if any, of the content instances 204 to select based at least in part on target vehicle information included in or associated with corresponding content instances 204.

As one example, the first vehicle 102a travelling in the first transmission region 232a receives the first plurality of content instances 204a-204c transmitted by the first antenna 202a. The head unit 104 of the first vehicle 102a processes target vehicle criteria 205 (see FIG. 4) associated with each of the respective first plurality of content instances 204a-204c to determine which, if any, of the first plurality of content instances 204a-204c to implement or present on the head unit 104. The determination by the head unit 104 regarding which, if any, of the content instances 204a-204c to implement (e.g., display, execute) is based on vehicle-specific information 212 (see FIG. 3) specific to the first vehicle 102a. For example, as a result of determining a correspondence between the target vehicle criteria 205a of a first content instance 204a and the vehicle-specific information 212, content of the first content instance 204a may be displayed on the head unit 104. The content presented may be, for example, an advertisement for or an icon representative of a store located in or near the corresponding transmission region.

In some embodiments, the content instances 204 may include content that is not for presentation to a user. For example, a content instance may include a protocol that, if implemented, causes the head unit 104 to perform a set of operations specified in the content instance, as described below in greater detail.

The first vehicle 102a may then exit the first transmission region 232a, enter the third transmission region 232c, and begin receiving the third plurality of content instances 204g-204i. The head unit 104 may cease presenting the first content instance 204a and determine which, if any, of the third plurality of content instances 204g-204i to implement, using target vehicle criteria 205. In connection with receiving and determining whether to implement the content instances 204, the vehicle 102 or head unit 104 may avoid sharing the vehicle-specific information 212 or other potentially sensitive information regarding a user or the vehicle 102 or even sending a request for the content instances 204. As a result, the privacy and the potentially sensitive information of the user or the vehicle 102 is preserved.

Figure 3:
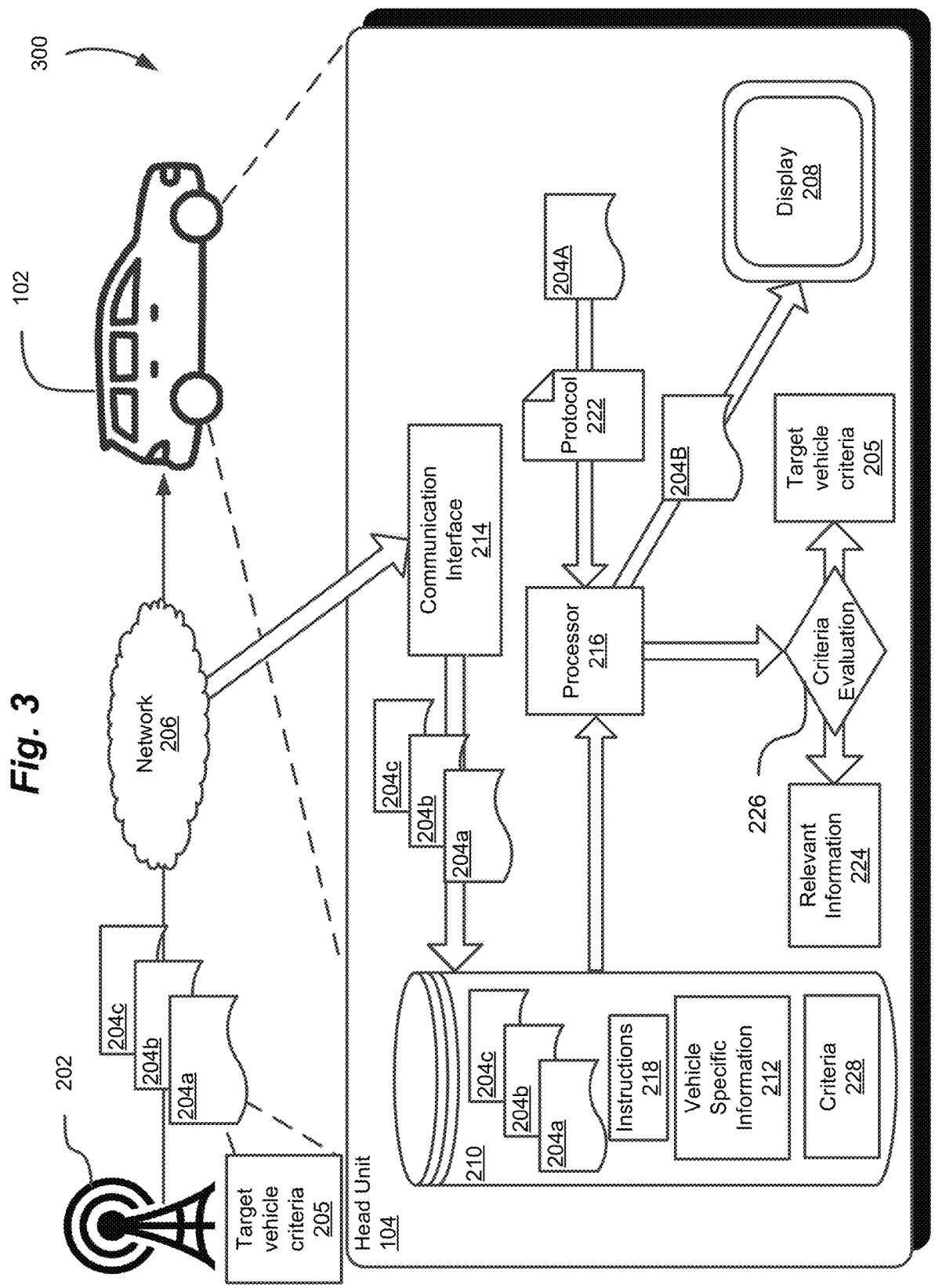
FIG. 3 illustrates an environment in which a plurality of content instances are received and evaluated for display on the head unit in accordance with embodiments described herein.

FIG. 3 illustrates an environment 300 in which a head unit of a vehicle receives content instances and determines which content to implement according to one or more embodiments. The environment 300 includes one or more transmission antennae 202 transmitting a plurality of content instances 204 over a network 206 to a head unit 104 of a vehicle 102. Some of the content instances 204 may include audio, image, or video content that, as a result of being processed, is presented by the head unit 104. As one example, individual instances of the plurality of content instances 204 may include one or more video or image data objects that cause presentation of video or image(s) on the display 208 as a result of processing the data object(s). As another example, the data objects may be links or references that, as a result of being processed, cause the head unit 104 to access video or image content in memory 210 of the head unit 104 (or some other computer onboard the vehicle 102) or remotely access video or image content via the network 206. As yet a further example, the plurality of content instances 204 may include one or more audio data objects that, as a result of being processed, cause an audio system of or associated with the head unit 104 to emit corresponding audio.

The content may be displayed on the display 208 and may include vehicle-maintenance suggestions, advertisements, reminders, map locations, etc., that are presented based at least in part on information specific to the vehicle 102. The memory 210 may include read-only memory (ROM) and/or random-access memory (RAM), and may comprise different types of memory, such as solid-state memory, hard disk drives, cache memory, and so forth. The plurality of content instances 204 may each include or have associated therewith target vehicle criteria 205 relating to the content of the respective content instances, as described herein. Individual content instances 204 may be received as an individual unit comprising the target vehicle criteria 205 and content to be implemented. In some embodiments, individual content instances 204 received may include, instead of the content itself, a link or a reference to a storage location containing the content that is useable to retrieve the content. The storage location may be stored locally in the memory 210 or in some other memory of the vehicle. However, the storage location may be a storage location remote to the vehicle 102 that is accessible via the communication interface 214 and the network 206.

In some embodiments, one or more of the content instances 204 may include protocol content that causes the head unit 104 to enforce certain protocols that cause the head unit 104 to perform particular sets of operations or modify the operation of the head unit 104. The protocol content may refer to or include instructions that define how the head unit 104 is to operate in certain circumstances. The protocol or protocol content, as one example, may be a policy or a set of instructions that define one or more aspects of how the head unit 104 behaves or operations performed by the head unit 104. As another example, the protocol may comprise a set of operations to be performed by the head unit 104 as a result of determining the presence or occurrence of one or more defined conditions or events. As described below, a protocol may have associated therewith a set of criteria for determining whether the head unit 104 should enforce the corresponding protocol. In at least one embodiment, the protocol content may not include audio, image, or video content—rather, the protocol content may cause the head unit 104 to determine what operations to perform based on events, detected conditions, etc., such as instructing the vehicle to operate in a particular manner, communicate with other head units, or alter the presentation of audio, image, or video content.

The plurality of content instances 204 may be transmitted to one or more vehicles 102 in a geographic region over the network 206 without the head unit 104 or the vehicle(s) 102 previously requesting transmission of the plurality of content instances 204 or previously providing vehicle-specific information 212 regarding the vehicle or users to the content provider. That is, the transmission of the plurality of content instances 204 by the antenna 202 is not in response to a request to provide content instances and not in response to previous provisioning of vehicle-specific information 212 by the head unit 104. The antenna 202 may be communicatively connected to a set of remote servers 124 that store and provide the plurality of content instances 204 to the antenna 202 for transmission. The plurality of content instances 204 may have an encoding or format that the head unit 104 is configured to decode, convert, or otherwise successfully process. The network 206 over which the plurality of content instances 204 is transmitted corresponds to one or both of the mobile network 120 or communication network 122 described above with respect to FIG. 1.

The head unit 104 includes a communication interface 214 through which the plurality of content instances 204 are received. The communication interface 214 may include one or more wireless network adapters, such as a cellular transceiver, Wi-Fi transceiver, a digital broadcast receiver and/or transmitter (e.g., digital radio receiver), Bluetooth® transceiver, or ZigBee® transceiver. The communication interface 214 may include one or more communication bus interfaces for connecting to a communication bus of the vehicle 102 via parallel interface, serial interface, or any common or proprietary interface for communication of data. The communication interface 214 may be communicatively coupled to one or more antennae of the vehicle 102 in some embodiments.

The communication interface 214 may include a transceiver (not illustrated) configured to establish an ad hoc network with head units 104 of other vehicles 102. The head units 104 may transmit and receive communications with other head units 104 via the ad hoc network and external to the network 206. In addition, the head unit 104 may communicate with a head unit 105 that is part of another vehicle over the network 206 or any other wireless network. Although the communication interface 214 is referred to in a singular form, the communication interface 214 may refer to a plurality of communication interfaces through which the head unit 104 may communicate with other head units 105 and/or systems of the vehicle 102 itself.

The head unit 104 includes one or more processors 216 that control operation of the head unit 104. As an example, the one or more processors 216 can be microprocessors, integrated circuits, field-programmable gate arrays (FPGAs), and the like that, as a result of executing a set of instructions 218 stored in the memory 210, cause the processor(s) 216 to perform one or more operations, such as those disclosed herein. The processor 216 may cause some or all of the plurality of content instances 204 received via the communication interface 214 to be stored in the memory 210. The instructions 218 may specify protocol content that defines a protocol to be enforced during normal operating conditions of the head unit 104. Normal operating conditions include non-hazardous conditions or conditions in which risk of an accident is not elevated, such as medium or moderate traffic conditions or safe weather conditions.

In some embodiments, one or more of the plurality of content instances 204 may respectively include protocol content defining protocols for affecting operation of the head unit 104. Some of the protocol content may cause the head unit 104 to affect operation of the vehicle 102. The protocol content may include or have associated therewith target vehicle criteria 205, information for determining whether a vehicle 102 receiving the protocol content should enforce the associated protocol. In some embodiments, a content instance 204a of the plurality of content instances 204 may include a protocol 222 and target vehicle criteria 205 for determining whether the head unit 104 should enforce the protocol 222. The target vehicle criteria 205 may identify information to evaluate whether to enforce the protocol 222.

The target vehicle criteria 205, for example, may identify a class or type of vehicle or travel conditions (e.g., vehicle density, weather conditions) for which, if experienced by a vehicle, the vehicle should enforce the associated protocol 222.

The processor 216 may process the target vehicle criteria 205 and obtain relevant information 224 for evaluating whether to enforce the protocol 222. The relevant information 224 may include vehicle-specific information 212 or other information, such as current information regarding the vehicle 102 (e.g., current speed), time or date information, ambient temperature, and precipitation conditions, by way of non-limiting example. Once the relevant information 224 is obtained, the processor(s) 216 may perform a criteria evaluation 226 to determine whether to implement the associated protocol 222. As a result of determining that the relevant information 224 associated with the vehicle 102 satisfies the target vehicle criteria 205, the processor 216 may extract the protocol 222 from the content instance 204a and initiate the protocol 222.

As an example, the processor 216 may determine that the target vehicle criteria 205 of the content instance 204a involves one or more criteria regarding current vehicle density (or traffic) around the vehicle 102. The processor 216 may obtain information regarding current vehicle density, e.g., via communications from head units 104 of other vehicles or accessing such information in the vehicle specific information 212, and compare the obtained information to the target vehicle criteria 205 regarding current vehicle density. If the target vehicle criteria 205 is satisfied, the processor 216 may initiate the protocol 222 associated with the target vehicle criteria 205.

The protocol 222 may specify actions to be taken by the head unit 104 to improve safety, reduce potential driver distraction, or collect information for facilitating safe and/or efficient travel. Enforcement of the protocol 222 may affect presentation of media content on the display 208. For example, the protocol 222 may cause the processor 216 to moderate what content is presented via the display 208 or how content is presented on the display 208.

The protocol 222 may dictate presentation of media content for a plurality of content instances 204. The plurality of content instances 204 received may include several instances of media content and the first content instance 204a may include a protocol 222 dictating how the instances of media content are presented. The protocol 222, for example, may include rules or instructions regarding an order in which the instances of media content are to be presented as a result of satisfaction of the associated target vehicle criteria 205.

The protocol 222 may define a priority of the instances of media content based on evaluation of the target vehicle criteria 205 associated therewith. The protocol 222 may specify rules defining how individual instances of media content should be presented on the display 208 in certain circumstances. For example, the protocol 222 may specify that content instances 204 should be presented in a smaller area of the display 208 or that only still images in the content instances 204 should be displayed. As another example, the protocol 222 may specify that a warning regarding potentially hazardous driving conditions should be presented on the display 208 and media for other content instances 204 should be temporarily discontinued.

In some embodiments, the protocol 222 may cause the head unit 104 to establish communications with other vehicles 102 or to collect certain information regarding operation of the vehicle 102. As an example, the protocol 222 may cause the head unit 104 to accept communications from other head units 105 (see FIG. 1). The protocol 222 may cause the head unit 104 to obtain a subset of the vehicle specific information 212 from the memory (e.g., information regarding speed, traffic, weather or road conditions, accidents, construction, vehicle performance, etc.) and transmit the information to the other head units 105. In some situations, the protocol 222 may cause the head unit 104 to affect aspects of vehicle 102 operation, such as speed, braking, driving modes, etc. The protocol 222 may cause the vehicle 102 to transition to a four-wheel drive mode in response to receiving communications from the other head units 105 indicating that vehicles ahead detected wheel slippage events.

In addition to initiating the protocol 222 under certain conditions, the environment 300 supports the selective implementation of content instances 204. In some cases, criteria 228 may be stored in the memory 210 for determining which, if any, of the plurality of content instances 204 should be implemented, such as being presented on the display 208. The criteria 228 defines criteria that the processor 216 may use to determine which, if any, of the plurality of content instances 204 to implement. The criteria 228 may include Boolean logic, conditions, and/or relationships involving content of the vehicle-specific information 212 and content of the target vehicle criteria 205. The processor 216 may consider at least some of the vehicle-specific information 212 and the target vehicle criteria 205 in view of the criteria 228 in connection with an evaluation of a content instance 204.

For example, the processor 216 may compare a subset of the vehicle-specific information 212 with a corresponding subset of the target vehicle criteria 205a of a first content instance 204a to determine whether to present the first content instance 204a on the display 208. As a result of determining that the vehicle-specific information 212 and the target vehicle criteria 205a of the first content instance 204a satisfies one or more of the criteria 228, the processor 216 may cause the display 208 to present the corresponding content of the first content instance 204a. In some embodiments, the target vehicle criteria 205 may include criteria for evaluating whether to present the associated content instance.

The criteria 228 may also include logic for determining an order or ranking of content instances 204 that have target vehicle criteria 205 satisfying one or more of the criteria 228 or the target vehicle criteria described below in comparison to the vehicle-specific information 212. As explained above, the processor 216 may determine a set of content instances 204 to be displayed by the head unit 104 based on the criteria 228, the vehicle-specific information 212, and the target vehicle criteria 205. The processor 216 may then use the criteria 228 to determine an order in which content instances 204 satisfying a threshold for presentation should be displayed. For example, the processor 216 may establish a queue in which content instances 204 having a higher rate of correspondence (e.g., number of matching criteria, degree of matching criteria) with the vehicle-specific information 212 are scheduled to be played before content instances 204 having a lower rate of correspondence. In at least some situations, more than one content instance 204 satisfying various criteria can be presented simultaneously. For example, one content instance may be presented on a navigation portion of the display 208 and another content instance 204 may be presented in a video presentation portion of the display 208.

As described herein, an individual content instance 204 may include protocol content that may cause the head unit 104 to perform one or more operations other than presentation of audio-visual content. The protocol content may cause the head unit 104 to collect certain vehicle-specific information 212 or cause the head unit 104 to communicate with other entities external to the vehicle 102. In some instances, the protocol content may cause the head unit 104 to transmit a subset of the vehicle-specific information 212 to the remote server 124.

Figure 4:
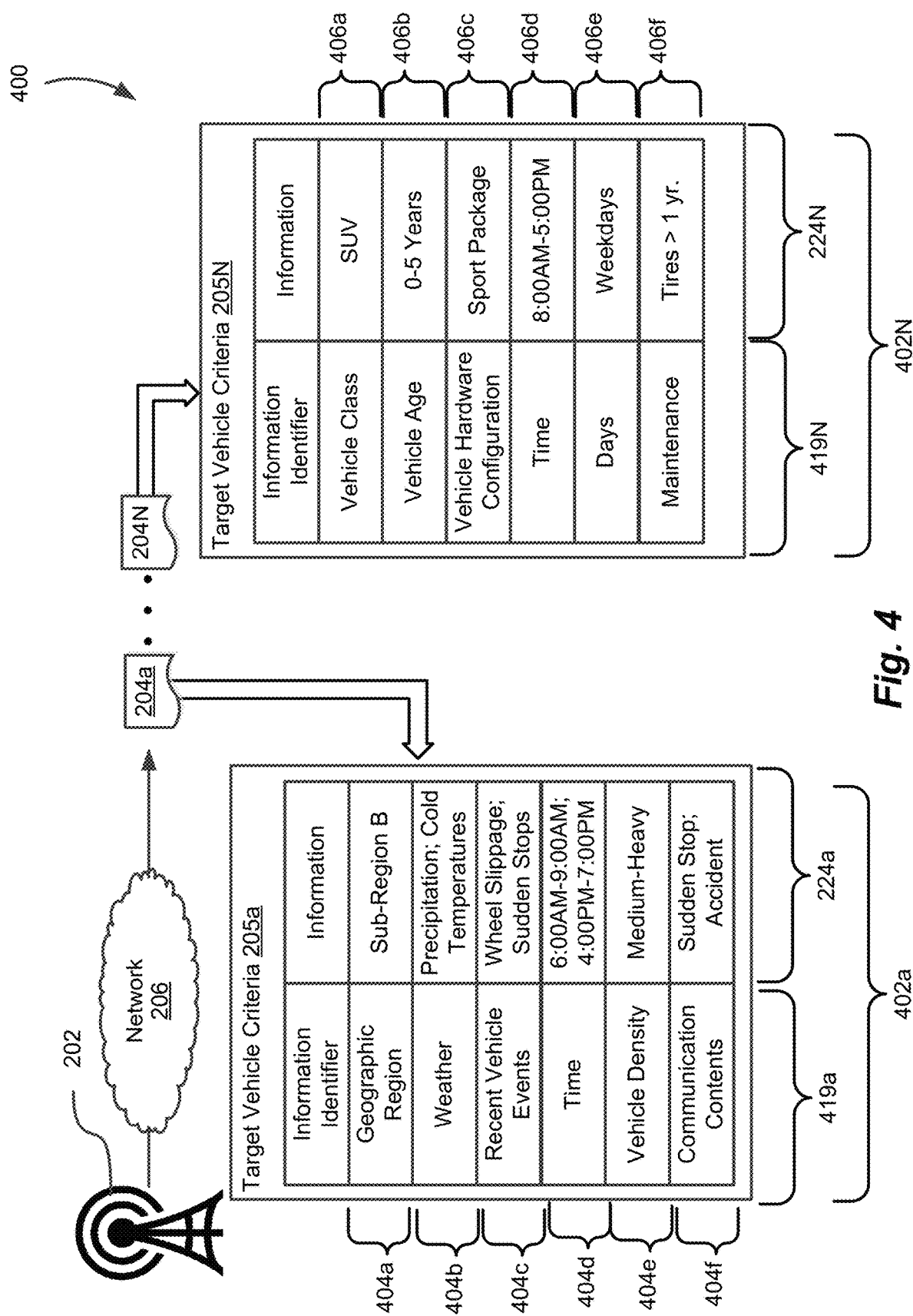
FIG. 4 illustrates an example environment in which the plurality of content instances include associated information in accordance with embodiments described herein.

FIG. 4 illustrates an environment 400 in which an antenna 202 transmits a plurality of content instances 204a-204N respectively having target vehicle criteria 205a-205N. The target vehicle criteria 205a-205N are data objects (or references to data objects) having information content 402 specifying characteristics to be considered when evaluating whether to implement the respective content instance 204 associated therewith. The information content 402 may indicate characteristics or conditions that, if found in the vehicle-specific information 212, should be considered in connection with a determination regarding implementation of the associated content instance 204.

In the illustrative example shown in FIG. 4, the content instance 204a may, for example, be protocol content specifying one or more protocols that, if implemented, affect operation of the head unit 104. Content instance 204a can include information content 402a that identifies characteristics or conditions that are to be considered in connection with determining whether to enforce a protocol specified in the content instance 204a. These characteristics or conditions are labeled by their respective information identifier 419a and include relevant information 224a. For example, the information content 402a for content instance 204a includes geographic region 404a, weather 404b, recent vehicle events 404c, time 404d, vehicle density 404e, and communication contents 404f.

In this example, the geographic region 404a may specify an area or region for the location of the vehicle 102 to be considered in connection with implementing the associated content instance 204a. For example, the geographic region 404a indicates that the head unit 104 should favor implementation of the associated content instance 204a as a result of identifying that the vehicle 102 is currently located in an area corresponding to the geographic region 404a. As an example, this area corresponding to the geographic region 404a may be a portion of a city or highway in which traffic is worse than in other areas or an area having a high rate of accidents.

The weather characteristics 404b may specify weather conditions that should be considered in connection with determining whether to implement the associated content instance 204a. Example weather characteristics 404b may include precipitation, current temperature, etc.

The recent vehicle events 404c may include specific information regarding the performance or operation of the vehicle 102 to be considered in connection with determining whether to implement the associated content instance 402a. For example, the recent vehicle events 404c may indicate wheel slippages (e.g., loss of traction on a wet or icy road) or sudden stop events that, if recently detected or experienced in connection with operation of the vehicle 102, would weigh in favor of implementing the associated content instance 204a.

The time characteristics 404d may specify time, dates, days, etc., that the head unit 104 should consider in connection with a decision regarding whether to implement the associated content instance 204a. The time characteristics 404d may include one or more specific times, one or more ranges of times, or some combination thereof.

The vehicle density characteristic 404e may specify a current number or density of vehicles surrounding or near the vehicle 102, such as within a selected distance from the vehicle 102, to be used as a factor to consider in connection with determining whether to implement the content instance 402a. In some embodiments, vehicle density may be based on communications between head units 104 of a plurality of vehicles 102. Head units 104 may be configured to establish communication channels with each other via ad hoc networks external to the network 206. The head units 104 may then measure vehicle density based on a number of communications received from other head units 104. In other embodiments, the head units 104 may measure vehicle density based on sensor measurements of the vehicle, such as cameras, radar, LIDAR, or proximity sensor measurements indicative of a density of nearby vehicles 102. In yet other embodiments, the head units 104 may obtain the current vehicle density from a remote service, such as via a content instance. In at least one such embodiment, each head unit 104 may transmit its current geographical position to the remote server, which can aggregate the head unit positions to determine the vehicle density of a geographical area.

In one arrangement, the value of vehicle density may be further granularized, such as by segregating nearby vehicles 102 based on which road or lane the vehicles 102 are currently traveling. For example, the value of vehicle density for a first vehicle 102 may be limited by considering only nearby vehicles 102 traveling in the same direction and on the same road as the first vehicle 102. As another example, the value may be restricted to only vehicles 102 within the same lane as the first vehicle 102, lanes that are adjacent to the lane of the first vehicle 102, or both.

The communication contents characteristic 404f may specify communication information that is provided to vehicles as a factor in whether to implement the associated content instance 204a. The communication contents characteristic 404f may indicate various conditions or events, such as sudden-stop events or accidents, that other vehicles 102 detect. In some embodiments, the vehicles 102 report such information to a remote server for re-broadcasting via antennae 202 and content instance 204a.

Other examples of information content 402a may be applicable. For example, an information identifier 419a may be related to the operational condition of the vehicle 102. An operational condition can include any parameter or status related to the operation of the vehicle 102. Examples of information defined by this identifier 419a include the age, mileage, make, model, repair or service history, or battery, oil, or fuel status of the vehicle 102. Additional examples include component wear, like estimated tread depth of the tires or remaining life of filters or other consumables of the vehicle 102.

The information identifiers 419a can indicate the relevant information 224a to be obtained in connection with the criteria evaluation. Based on the information identifiers 419a, the head unit 104 may obtain or otherwise receive corresponding information from the vehicle-specific information 212 or from some other suitable source. In some instances, the target vehicle criteria 205 may cause or instruct the head unit 104 to obtain certain information that is not currently stored. As an example, the target vehicle criteria 205 may cause the head unit 104 to obtain measurements regarding vehicle operation or events. Non-limiting examples of vehicle operation or events include speed, braking events, and wheel slippage (loss of traction). The target vehicle criteria 205 may include considerations relating to current or recent weather conditions, such as precipitation or temperature.

As a further example, another content instance 204N related to an outdoor recreation store has target vehicle criteria 205N for determining whether to present the content instance 204N. In this case, the target vehicle criteria 205N depicted identifies information content 402N, which is defined by its respective information identifier 419N and the corresponding relevant information 224N. In this example, the information content 402N includes vehicle class characteristics 406a, vehicle age characteristics 406b, vehicle hardware configuration characteristics 406c, time characteristics 406d, days characteristic 406e, and maintenance characteristics 406f. The information relevant to these information identifiers 419N may be scrutinized to determine whether to implement the content instance 204N.

The vehicle class characteristics 406a may specify a class, type, make, model, etc., of the target vehicle. The vehicle age characteristics 406b may specify an age or year or wear status of the target vehicle. The vehicle hardware configuration characteristics 406c may specify hardware features (e.g., four-wheel drive, off-road package, towing package, xenon headlights) or editions of the target vehicle (e.g., standard, sport, luxury). The time characteristic 406d and the days characteristic 406e may specify times and days during which the corresponding content instance 204N should be implemented. The maintenance characteristics 406f may indicate the maintenance status of various parts of the vehicle, such as a time period or distance travelled since the last tire or oil change.

These are non-limiting examples of considerations or characteristics for target vehicles that may be useful in determining whether to implement the corresponding content instance 204a-204N. In this illustration, because the content instance 204N is related to a different content instance corresponding to media content and/or a different protocol from content instance 204a, the relevant target vehicle criteria 205N includes characteristics and/or conditions different from the characteristics and/or conditions of the target vehicle criteria 205a. As discussed herein, the content instances 204 may include media content for presentation by the head unit 104. Such content instances 204 may include or have associated therewith target vehicle criteria 205 for determining whether to present the corresponding media content. Further description regarding this subject matter is included in U.S. patent application Ser. No. 16/210,207, filed Dec. 5, 2018, which is incorporated herein by reference in its entirety.

Content instances 204 may also include important safety information for alerting or educating the user, such as a safety recall particular to the make, model, and year of the vehicle 102. Such safety information should have a relatively higher priority than advertisements, and the head unit 104 should therefore present such safety-related content before advertisements. A safety-recall, for example, may be issued for airbags of vehicles 102 residing along coastlines due to the corrosive properties of salt in the air. Safety-related information may be associated with a geographical region. Protocol content included in the content instances 204 may cause the head unit 104 to prioritize presentation of such safety-related information over other content. In some instances, the head unit 104 may modify operation of the vehicle 102 based on the protocol content. Other types of content instances 204 may include vehicle operation information for advising users regarding operation of various features of the vehicle 102, and vehicle maintenance information for advising users on how and when to perform maintenance on the vehicle 102.

These examples are illustrative and not intended to be limiting. As another example, the target vehicle criteria 205 may include conditions related to the operation of a vehicle, like fuel level, oil pressure, radiator temperature, or battery voltage. In addition, the types of characteristics, conditions, or factors included in the target vehicle criteria 205 may be periodically updated. Moreover, the information content 402 may include factors, characteristics, conditions, etc., that are favorable, adverse, or disqualifying to a determination regarding presentation of the content instance 204. The information content 402, in some instances, may be used to determine a presentation priority of one content instance relative to another—for example, an order in which a plurality of content instances 204 selected for presentation should be presented.

The information content 402 of the target vehicle criteria 205 may be organized in any appropriate manner. The information content 402 may be formatted as a one-dimensional array, such as a delimiter-separated value format in which a delimiter (e.g., semi-colon, comma, tab) separates different characteristics and conditions of the information content 402. Alternatively, the information content 402 may be formatted as a two-dimensional array or as a table having multiple columns and headings, as shown in FIG. 4.

Figure 5:
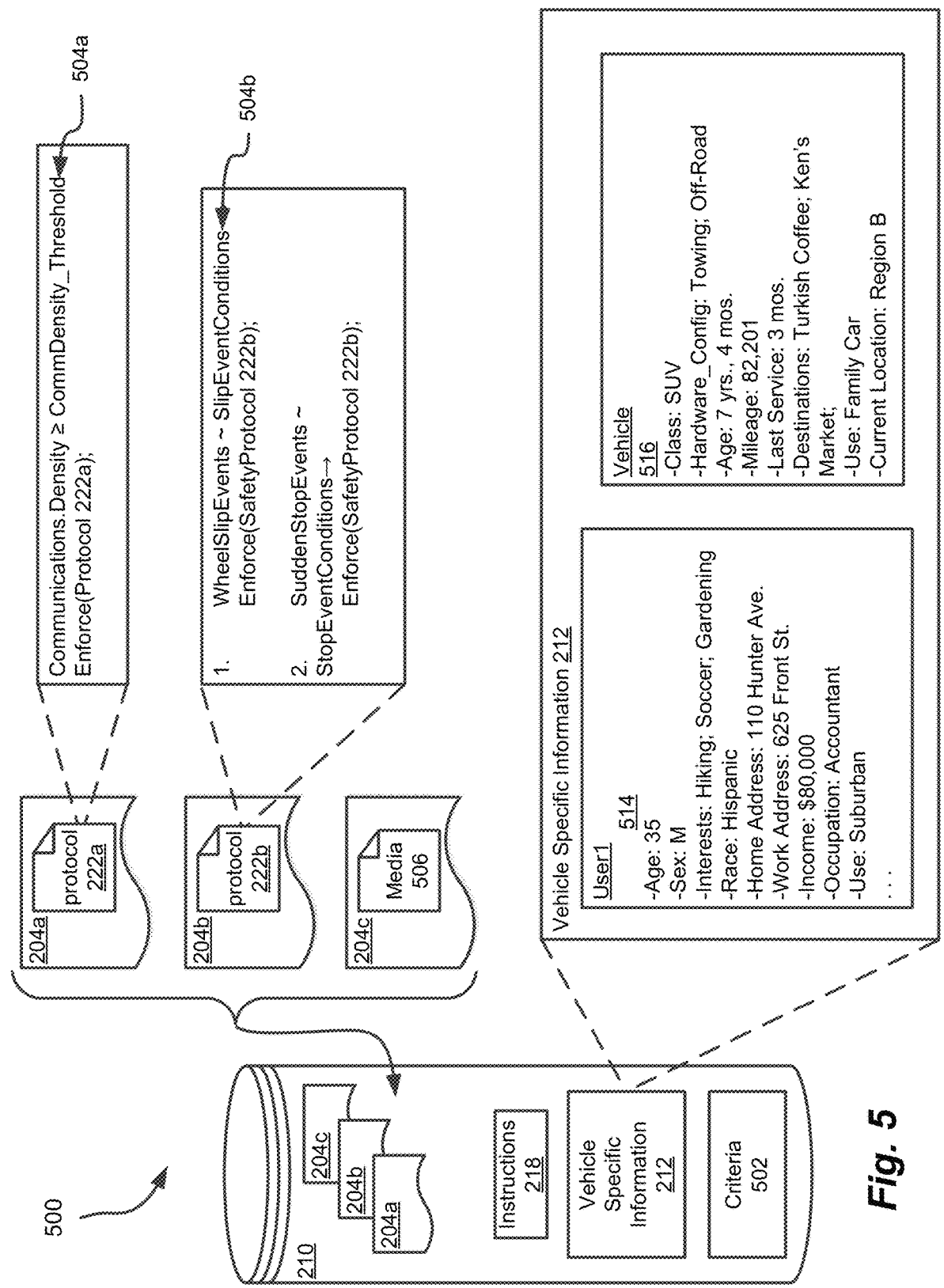
FIG. 5 illustrates a use case example of storage content of the head unit in accordance with embodiments described herein.

FIG. 5 illustrates storage content 500 of the memory 210 of the head unit 104 according to one or more embodiments. The storage content includes the plurality of content instances 204 received, the computer-executable instructions 218 for operation of the head unit 104, and the vehicle-specific information 212. The memory 210 may also store criteria 502 for additional determinations regarding implementation of the content instances 204, such as a priority or order of content instances to be presented. In some instances, one or more of the content instances 204 received may include a protocol 222 configured to affect operation of the head unit 104, as described herein. As an example, the protocol 222 may include or have associated therewith protocol criteria 504 defining conditions, Boolean logic, relationships, etc., involving content of the vehicle-specific information 212 or other vehicle-related conditions or operations. The protocol criteria 504 may correspond to the target vehicle criteria 205 discussed herein. The protocol criteria 504 may be logic preprogrammed and stored in the memory 210 as part of the instructions 218 or as a separate set of instructions, logic, script, or object code that causes the processor 216 to determine implementation of a plurality of content instances 204. In either case, the protocol criteria 504 may be periodically updated. The protocol 222 may include computer-executable instructions, logic, script, object code, etc. that cause the processor 216 to perform a set of operations as a result of evaluation of the protocol criteria 504. The protocol may be a collection of data objects and/or instructions, as described herein.

The head unit 104 may implement a protocol 222 as a result of determining that corresponding vehicle-specific information 212 or other vehicle-related or environmental conditions satisfy protocol criteria 504. The processor 216 may evaluate the target vehicle criteria 205 of the plurality of content instances 204 and the vehicle-specific information 212 using the protocol criteria 504 or criteria 502 (or both) to determine which, if any, of the content instances 204 to implement as a result. Furthermore, a protocol 222 that has been implemented may cause the processor 216 to adjust the presentation of media content or the priority of content instances 204 relative to other content instances or decline to present a content instance 204 that was previously marked for presentation.

An example of how content instances 204 may be evaluated will now be described with respect to FIG. 5; however, this example is merely illustrative and not intended to limit the scope of the instant disclosure. In this example, a content instance 204a includes a protocol 222a and associated protocol criteria 504a for determining whether to enforce the protocol 222a. The protocol criteria 504 define conditions that, if determined to be present in connection with the vehicle 102, cause the processor 216 to implement one or more protocols. The criteria 504a, for example, may be for implementing a protocol for heavy traffic conditions. The protocol criteria 504a specifies conditions related to communications between head units 104 of separate vehicles 102.

For example, the protocol criteria 504a specifies that if communication density for head units 104 in a particular area meets or exceeds a communication density threshold, the processor 216 will enforce a corresponding protocol A. Communication density may be defined as a number of communications received by the head unit 104 of the vehicle 102 within a certain time period. Alternatively, communication density may correspond to a number of head units 105 of other vehicles communicating with the head unit 104 of the vehicle 102 and to each other in a defined area within a certain time period. In this example the protocol criteria 504a may specify implementing the corresponding protocol 222a as a result of the number of communicating head units 104, 105 exceeding a certain threshold.

The protocol 222a implemented as a result of satisfaction of one or more of the criteria 504a may cause the head unit 104 to modify presentation of media content by the head unit 104 to reduce the likelihood of driver distraction. For example, the protocol 222a may cause the head unit 104 to moderate the number of media content instances 204 presented on the display 208, modify how media content instances 204 are displayed (e.g., lower volume, less prominent presentation), or cease presentation of media content instances 204 during implementation of the protocol 222a. Implementation of such a protocol 222a may affect how or whether media content 506 included in a content instance 204c of the plurality of content instances 204 received is presented. Moreover, some media content may be included in the same content instance 204a, such as an alert or safety message, to be presented on the head unit 104 in connection with implementation of the protocol 222a. As another example, the protocol 222a may provide communications having certain content to the head units 105 of other vehicles. Examples of such communications include information regarding operation of or events associated with the vehicle 102 (e.g., sudden stop events, wheel slippage events, speed information, dangerous operating conditions, or requests for vehicle operation information).

Criteria 504b of another content instance 204b may include conditions related to operation of the vehicle 102 or other vehicles 102 in an area. For example, the criteria 504b may specify that if the vehicle 102 experiences a certain number of wheel slippage events (e.g., loss of traction) within a certain time period that satisfies defined slip-event conditions, a corresponding protocol 222b should be implemented. Evaluation of the criteria 504b may be based on vehicle operation events of the vehicle 102 and/or based on communications received from head units 105 of other vehicles 102, which may indicate information regarding wheel slippage events experienced. The defined slip-event conditions may include conditions related to environmental conditions that have been detected, such as ambient temperature or the presence of precipitation, which might indicate the presence of wet or icy roads. Implementation of the corresponding protocol 222b may cause the head unit 104 to affect operation of the vehicle 102 to reduce the likelihood of accidents, such as by causing the vehicle 102 to maintain a certain distance behind a vehicle 102 directly ahead or restricting the speed or acceleration of the vehicle 102. Other protocols may be implemented for affecting presentation of media content, affecting operation of the vehicle 102, or communicating with head units 105 of other vehicles 102, as described herein.

The protocol criteria 504 may include other conditions related to sudden stop events of vehicles 102, vehicle speed, etc., that might indicate the presence of heavy traffic or accidents. The corresponding protocols to be implemented may specify instructions or operations to alleviate traffic, such as maintaining a certain speed or moving to or staying in a particular lane. Communications between head units 104 may facilitate coordination of vehicles 102 to alleviate traffic conditions or instruct drivers on more efficient routes to a destination. The protocol criteria 504 may include conditions regarding vehicle-specific information 212 stored in the memory 210, as described herein.

The vehicle-specific information 212 stored in the memory 210 may include user information 514 regarding one or more users of the vehicle 102 or vehicle information 516 specific to the vehicle 102 itself (or both). A user may be the owner or a person who otherwise drives the vehicle 102, and the user information 514 may be personal information of the user. The vehicle information 516 can be any information related to the design, specifications, or operations of the vehicle 102.

As an example, the user information 514 may comprise demographic information (e.g., age, gender, race), information regarding interests of the user, location information associated with a user, such as work, home, or school addresses, or professional and educational information. Other examples of user information 514 include driving or purchasing history. For instance, the user information 514 may include destination information regarding previous destinations of the user while operating the vehicle 102 or some other form of transportation. Information related to purchases may originate from transactions conducted through the head unit 104 or other devices.

A user may provide the user information 514 by entering the information as user input to the display 208 of the head unit 104, which may then store the entered user input as user information 514. Alternatively, the user information 514 may be obtained by the head unit 104 via a communication network. For example, a user may connect (e.g., pair) the user's mobile device 114 with the head unit 104 through the communication interface 214 of the head unit 104 or some other communication interface. The user may authorize establishment of a private connection with the head unit 104 and enter user information 514 via an application on the mobile device 114. The user may alternatively authorize the head unit 104 to automatically access content from applications on the mobile device 114 to obtain at least some of the user information 514. The head unit 104 may store the user information 514 in a protected manner such that the head unit 104 does not share the user information 514 without authorization from the user. (As an example, any user information 514 stored on the vehicle 102 can be encrypted.) As a result, the user information 514 is protected, and the privacy of the user is not compromised via the head unit 104.

Some of the vehicle information 516, such as the class, make, and model, may be static information. Some of the vehicle information 516 may be dynamic information that is updated or changed, such as fuel level or battery voltage. Dynamic vehicle information 516, like the mileage or the age of the vehicle 102, may be updated based on use or on a periodic basis. Some of the vehicle information 516 may be updated as a result of certain events. The head unit 104 may, for example, interface with the vehicle 102 through a user interface and update the last service date as a result of corresponding events received over a communication bus of the vehicle 102. As another example, the head unit 104 may receive instructions to navigate the user to a destination via a global positioning system (GPS) receiver and may update the vehicle information 516 to show the destination as the current location upon arrival. Alternatively, the head unit 104 may obtain, upon authorization by the user to do so, destination information from a navigation application on a mobile device 114 of the user and update the vehicle information 516 based on the destination information obtained. In one embodiment, the accessories 108-10c or any other sensor or system of the vehicle 102 can provide data to update the dynamic vehicle information 516. Additionally, such data can be received from a source that is remote to the vehicle 102.

In some cases, the head unit 104 may set or modify the vehicle-specific information 212 based on how the vehicle is used, such as whether the vehicle is primarily used in urban, suburban, or rural settings. The processor 216 may track a location of the vehicle over time using GPS information and determine use characteristics of the vehicle or a specific user based on the tracked location. If, for example, a user primarily uses the vehicle 102 in suburban settings, the processor 216 may update the vehicle-specific information 212 to reflect this characteristic. The head unit 104 may also track use of the vehicle by destination to determine how the vehicle 102 is used. The head unit 104 may determine that the vehicle 102 is used primarily as a family car as a result of tracking that the vehicle 102 is driven between a home and a school during the week. As another example, the head unit 104 may determine that the vehicle 102 is driven daily as a result of tracking the vehicle 102 between home and work during the week. Use of the vehicle may be reflected in the user information 514 and/or the vehicle information 516.

Modifying the vehicle-specific information 212 according to vehicle use may enable the head unit 104 to improve targeting of content to the user(s) of the vehicle. In some embodiments, the vehicle-specific information 212 indicates that the vehicle is a sport utility vehicle with an off-road package. Based on this information alone, the head unit 104 may provide content instances 204 directed toward outdoor recreation. However, as a result of tracking specific use of the vehicle 102 based on vehicle location and destination tracking, the head unit 104 may determine that the vehicle 102 is used as a family car and provide content appropriate to such use. By contrast, the head unit 104 may identify a vehicle 102 frequently used to travel in mountainous terrain as having off-road or rural use. Vehicle use may be correlated according to time and date such that use of the vehicle 102 may be tagged as having one use characteristic during the week and another use characteristic during the weekends, as one example. The vehicle-specific information 212 may include more than one vehicle use characteristic.

Some content instances 204 may include protocol content that causes the head unit 104 to collect and store information as vehicle-specific information 212. As an example, the protocol content may include instructions for collecting certain vehicle-operation information regarding the vehicle 102. The vehicle-operation information may be obtained from one or more accessories 108a-108c or another system of the vehicle 102, such as from an electronic control unit of the vehicle. The vehicle-operation information may be indicative of conditions or events associated with operation of the vehicle 102, such as speed, efficiency, and hazardous conditions. As an example, the head unit 104 of the vehicle 102 may adjust presentation of audio-visual content of the plurality of content instances 204 based on this vehicle operation information. For example, if the vehicle operation information indicates multiple wheel slippages or a high rate of velocity, then the head unit 104 may pause or minimize the presentation of content to the user of the vehicle 102 to reduce distractions while the wheel slippage is occurring or the vehicle is over a certain speed.

In some embodiments, the protocol content causes the head unit 104 to communicate with entities external to the vehicle 102. As one example, a first vehicle may be in communication (synchronously or asynchronously (or decentralized)) with a second vehicle via a vehicle-to-vehicle communication channel. In some embodiments, the head unit 104 transmits or causes transmission of vehicle-specific information 212 to the remote server 124, which may perform one or more operations in response. As an example, the head unit 104 of the first vehicle may transmit, over the network 206, information indicative of traffic or hazardous road conditions.

In response, the server 124 may generate information indicative of hazardous driving or traffic congestion conditions and send content to vehicles 102, including the second vehicle, indicating the conditions. The head unit 104 of the second vehicle may determine whether to implement protocol content based on criteria included in or associated with the information received from the remote server 124. This additional information may be processed in lieu of or supplemental to the data internal to the second vehicle in determining whether to implement the protocol content. This exchange may also occur without the assistance of an external, coordinating system.

As referenced above, the head unit 104 may determine content instances 204 to implement based on vehicle-specific information 212 and criteria 502. The head unit 104 may modify the vehicle-specific information 212 over time based on maintenance or operation of the vehicle 102 or user input or preferences. Some of the vehicle-specific information 212 may include information regarding vehicle operations (e.g., speed, braking), vehicle events (e.g., wheel slippage events, sudden stop events, collisions), and conditions detected around the vehicle using various sensors (e.g., ambient temperature, distance to nearby objects).

Figure 6:
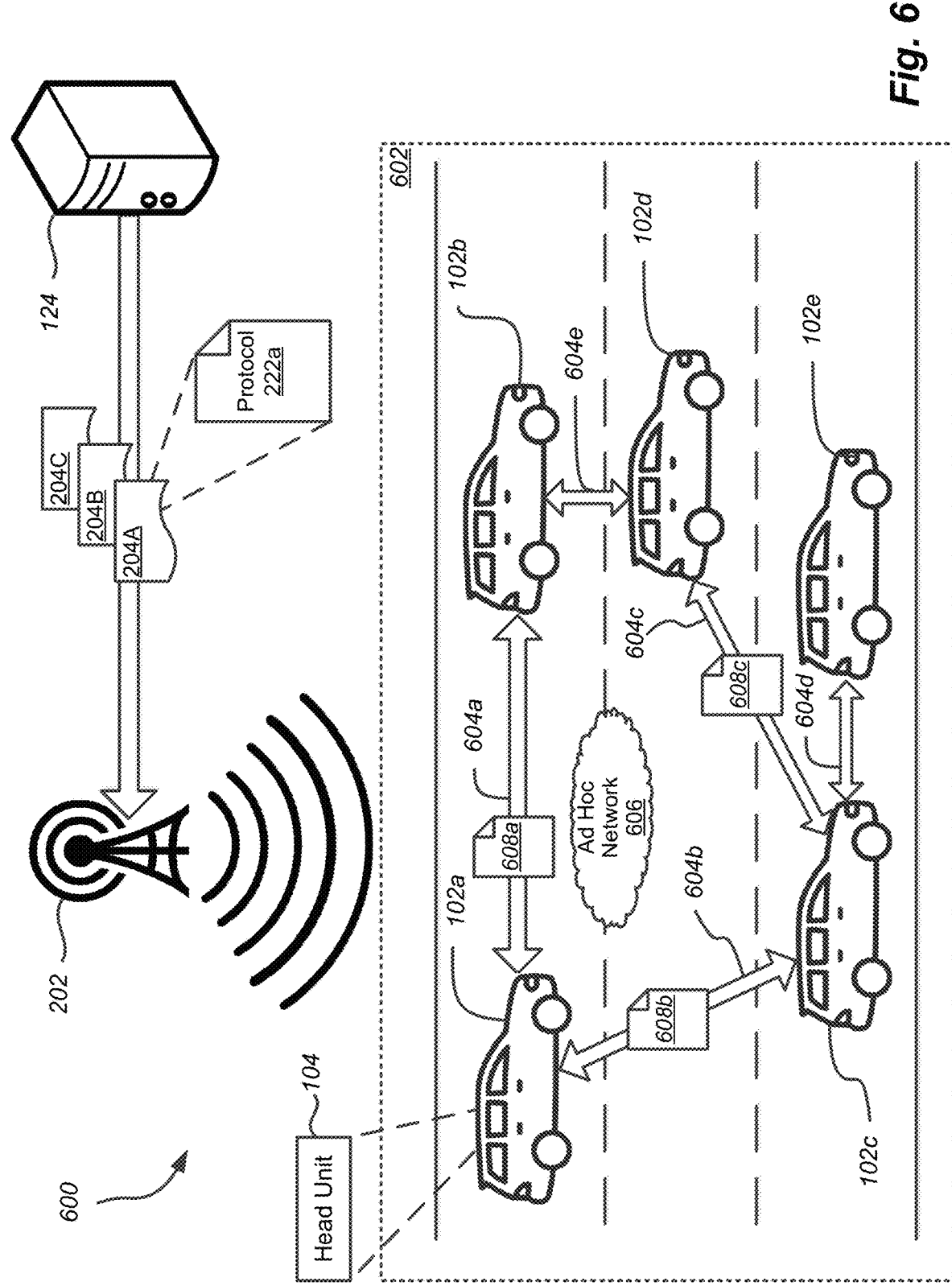
FIG. 6 illustrates an example environment in which head units in a geographic region communicate with each other.

FIG. 6 illustrates an environment 600 in which head units 104 of vehicles 102 in a defined geographic region 602 communicate with each other according to one or more embodiments. A remote server 124 may cause one or more antennae 202 to transmit a plurality of content instances 204 to head units 104 of vehicles 102 located in the geographic region 602, as described herein. One or more of the content instances 204 may include or specify a protocol 222 that, if implemented, would affect operation of the head unit 104. Furthermore, head units 104 of the vehicles 102 in the region 602 may establish wireless communication connections 604 with head units 104 of other vehicles 102. A vehicle 102a may, for example, establish a communication connection 604a with a second vehicle 102b and establish a second communication connection 604b with a third vehicle 102c. The third vehicle 102c may establish a third communication connection 604c with a fourth vehicle 102d and a fourth communication connection 604d with a fifth vehicle 102e. It is not necessary that every vehicle 102 in the region 602 establish a communication connection 604 with every other vehicle 102 in the region or even every other vehicle 102 within wireless communication range.

In various embodiments, head units 104 may establish such wireless communication connections 604 based on a particular protocol 222 provided by antennae 202. The protocol 222 may indicate which head units 104 of which vehicles 102 are to communicate with one another, what information or content is to be communicated between head units 104, what communication protocols are to be utilized, or other protocol-related conditions or criteria, or some combination thereof.

The communication connections 604 may be established using one or more wireless transceivers included in the communication interface 214. Examples of such wireless transceivers include cellular transceivers, Wi-Fi transceivers, Bluetooth® transceivers, and ZigBee® transceivers. The communication connections 604 may be established, and communications transmitted thereby, according to one or more communication protocols, such as ad hoc routing protocols, such as table-driven routing protocols, hierarchal routing protocols, on-demand routing protocols, or some combination thereof. The communication connections 604 may comprise an ad hoc network 606 implemented according to principles of vehicular ad hoc networks (VANETs), mobile ad hoc networks (MANETs), wireless mesh networks, or other similar ad hoc networking principles.

In some instances, the communication connections 604 may be established in response to a vehicle 102 entering the region 602. In some instances, the communication connections 604 may be established as a result of implementation of a protocol 222 included in a content instance 204 received by the head unit 104. The head units 104 may transmit communications 608 to head units 104 of other vehicles 102. The communications 608 may include information regarding vehicle operations, vehicle events, or conditions, including those detected by a vehicle 102. For example, the second vehicle 102b may transmit a communication 608a to the first vehicle 102a indicating wheel slippage events occurring in the second vehicle 102b or detected by other vehicles in communication with the second vehicle 102b. The content of the communications 608 may include information indicating various conditions, vehicle events, or vehicle operation, including sudden braking events, collisions, loss of control, traffic, speed, and objects in the road, by way of example. The communications 608 may specify location information (e.g., global positioning information) that is useable by head units 104 to determine a relative position of other communicating vehicles 102 in the region 602.

The first vehicle 102a may transmit a second communication 608b to the third vehicle 102c indicating information regarding the vehicle 102a and may also include information regarding the second vehicle 102b received via the communication 608a. The third vehicle 102c may send a third communication 608c including information regarding the first vehicle 102a and the second vehicle 102b and so on. In this way, the head units 104 communicating with each other in the region 602 may be apprised of nearby conditions, events, operations, etc., regarding other vehicles 102. The head units 104 may adjust their operation in accordance with a received protocol 222 received or based on the communications 608 with other head units 104 (or both).

In some embodiments, the communications 608 may include information indicating a number of vehicles 102 included in the region 602 that are in communication with each other. A size of the region 602 may correspond to a collective maximum communication range of the vehicles 102 or may be set to a particular area or range. The information indicating the number of vehicles 102 may be useable to determine the presence of heavy traffic in the region 602. The head unit(s) 104 may implement a protocol 222 based on protocol criteria 504 regarding the presence of heavy traffic in the region 602 to reduce risk of driver distraction or collision.

One or more of the head units 104 communicating in the region may send information over the mobile device network 120 or the communication network 122 to the remote server 124. In some instances, such information may be sent according to a protocol 222 received by one or more of the head units 104 in a content instance 204. Due to privacy concerns, the information sent to the remote server 124 may be anonymized to not include any information specific to a user or vehicle. The information sent to the remote server 124 may exclude the user information 514 and may exclude vehicle information 516 to the extent such information is useable to identify a specific vehicle 102.

Figure 7:
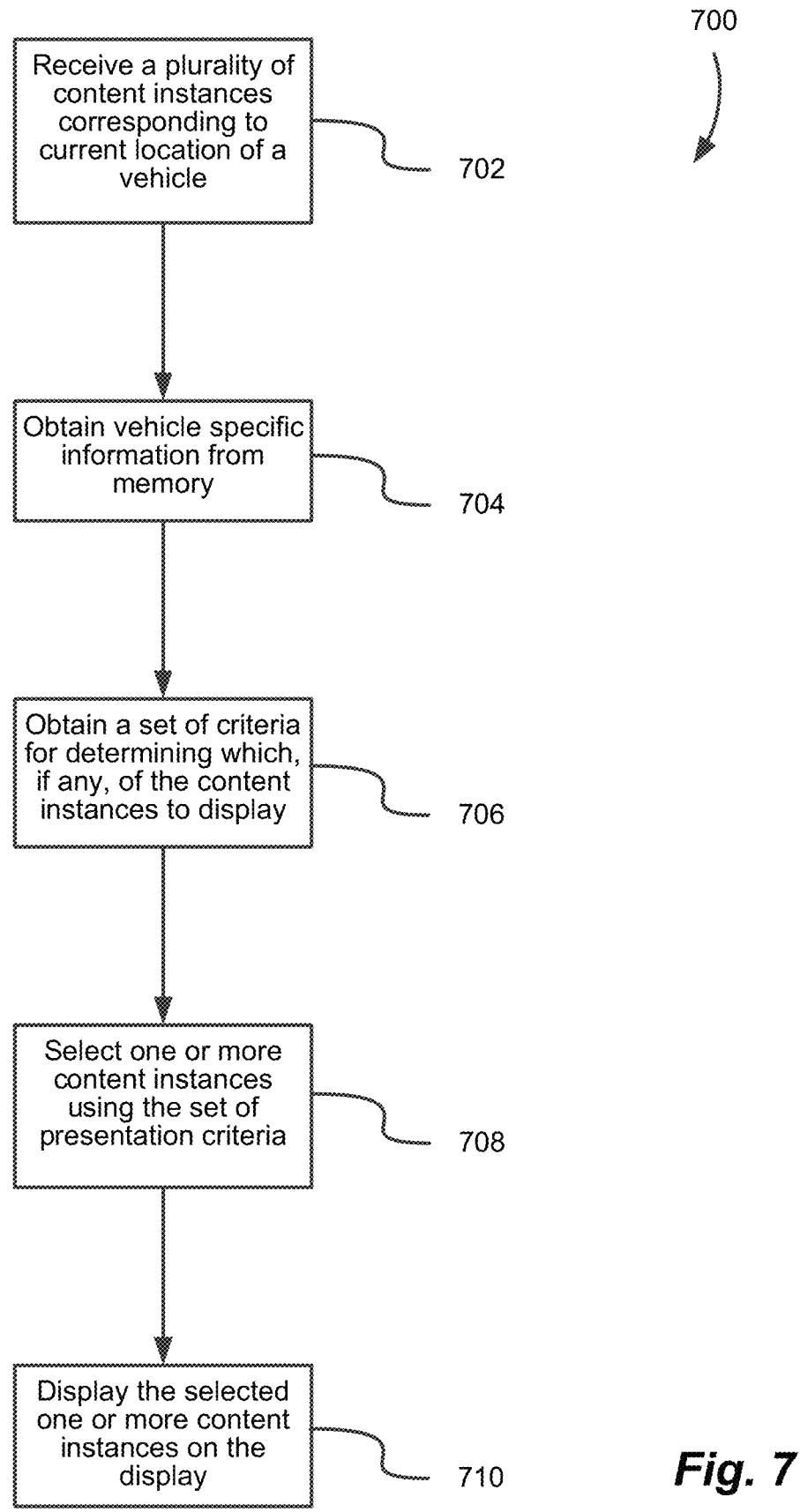
FIG. 7 illustrates a method for selecting and displaying one or more content instances of the plurality of content instances in accordance with embodiments described herein.

FIG. 7 illustrates a method 700 of operating the head unit 104 according to one or more embodiments described herein. The method 700 begins by receiving 702 a plurality of content instances 204, which may correspond to a current location of the vehicle 102 in which the head unit 104 is installed. The plurality of content instances 204 are received 702 over the network 206 without the head unit 104 previously requesting provisioning of the plurality of content instances 204. In some embodiments, the plurality of content instances 204 are received 702 in response to the head unit 104 providing location information regarding a current location of the vehicle 102. In other embodiments, the plurality of content instances 204 are received 702 without the head unit 104 providing location information regarding the current location of the vehicle 102. The plurality of content instances 204 may be received 702 as a result of the vehicle 102 being in a particular region 232 associated with the plurality of content instances 204.

At 704, the method 700 includes obtaining, from the memory 210, the vehicle-specific information 212, which may include the user information 514 and the vehicle information 516, as described above with respect to FIG. 5 and elsewhere herein. At 706, the method 700 includes obtaining a set of criteria for determining which, if any, of the plurality of content instances 204 should be implemented, such as being presented on the display 208. Obtaining 706 the set of criteria includes obtaining, from the memory 210, the set of criteria 228. In some embodiments, at least some of the set of criteria may be obtained from the target vehicle criteria 205 received in connection with the plurality of content instances 204.

At 708, the method 700 may include selecting one or more content instances of the plurality of content instances 204 using the set of criteria 228. Selecting 708 the one or more content instances may be based at least in part on an evaluation involving the vehicle-specific information 212 and associated information of the plurality of content instances 204, as described in further detail with respect to FIG. 9 and elsewhere herein. As a result of selecting 708 the one or more content instances, the method 700 includes displaying 710, or otherwise causing the display of, the one or more selected content instances on the display 208.

Figure 8:
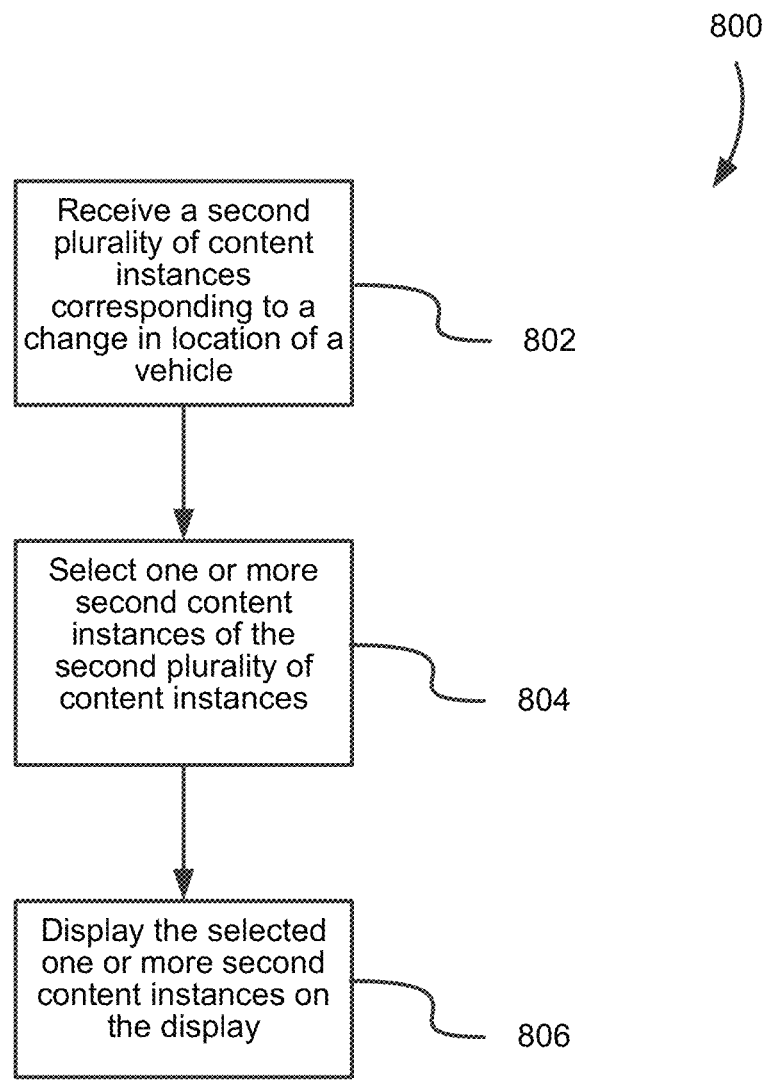
FIG. 8 illustrates a method for selecting and displaying one or more second content instances of a second plurality of content instances in accordance with embodiments described herein.

FIG. 8 shows a method 800 for selecting one or more second content instances of a second plurality of content instances 204 according to one or more embodiments. The method 800 is a continuation of the method 700 and may proceed from any one of steps 702 through 710 discussed with respect to FIG. 7. The method 800 proceeds by receiving 802 a second plurality of content instances different from the plurality of content instances of the method 700. The second plurality of content instances may be received 802 as a result of the vehicle 102 changing locations from one transmission region to another transmission region. For example, with reference to FIG. 3, the head unit 104 of the vehicle 102*a* may receive a first plurality of content instances corresponding to the content instances 204*a*-204*c* in the first transmission region 232*a*. Then, the vehicle 102*a* may be driven to the third transmission region 232*c* in which the head unit 104 receives a second plurality of content instances corresponding to the content instances 204*g*-204*i* in the third transmission region 232*c*.

The method 800 includes selecting 804 one or more second content instances of the second plurality of content instances. Selecting 804 one or more second content instances is performed according to operations described with respect to FIG. 7 and elsewhere herein. At 806, the head unit 104 causes the one or more second content instances selected to be displayed on the display 208.

Figure 9:
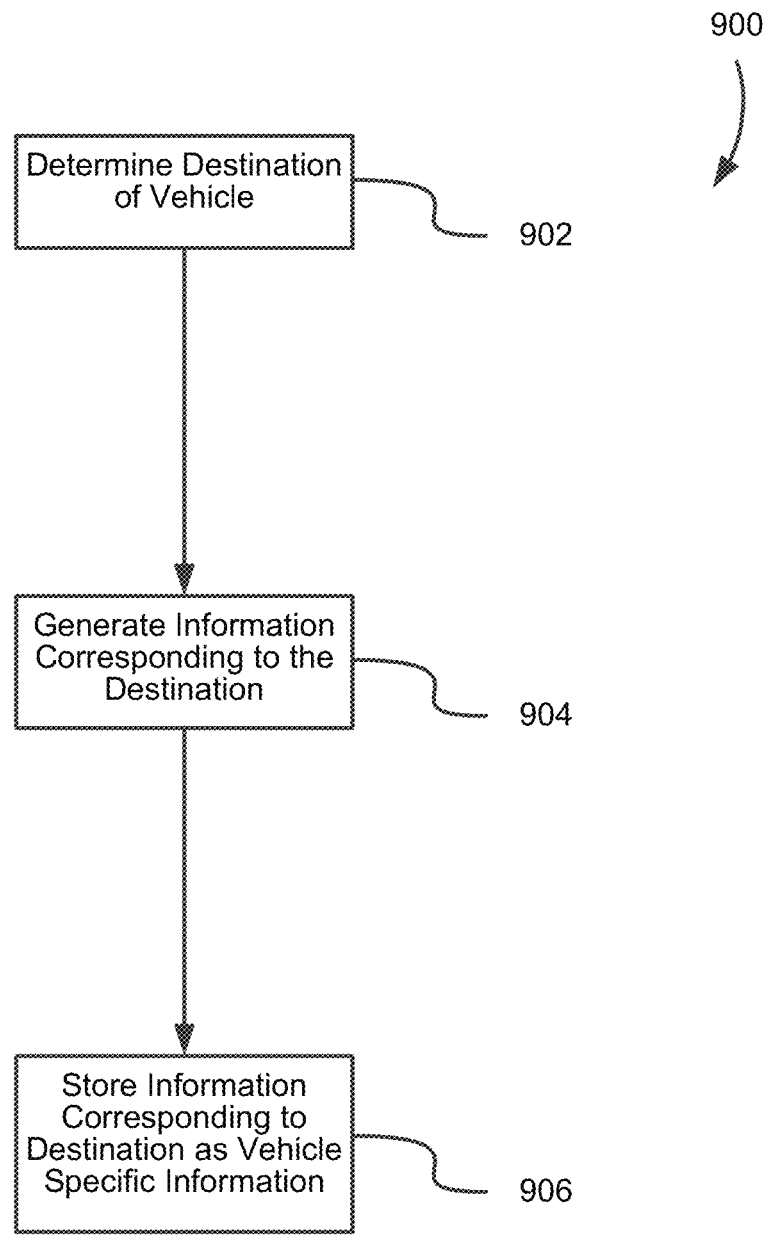
FIG. 9 illustrates a method for storing information regarding a destination of a vehicle as part of vehicle-specific information in accordance with embodiments described herein.

FIG. 9 shows a method 900 of storing information regarding a destination of a vehicle as part of the vehicle-specific information 212 according to one or more embodiments. The method 900 may be performed in connection with or as part of the method 700 or the method 800. The method 900 begins by identifying 902 a destination of the vehicle 102. Identifying 902 the destination may include receiving information entered into a navigation system of the head unit 104. Identifying the destination may include receiving GPS information indicating a current position of the vehicle in connection with receiving a signal from the vehicle 102 indicating the occurrence of a vehicle operation event of a defined set of vehicle operation events. Such defined events may include the vehicle 102 turning off or a passenger car door opening while the vehicle 102 is stopped.

At 904 of the method 900, the head unit 104 generates information corresponding to the destination. Such information may include information regarding a category or type of the destination or information regarding interests associated with the destination. If the vehicle 102 stops at a yoga studio, for example, the head unit 104 may generate interest information indicating that a user of the vehicle 102 is interested in fitness, yoga, health, etc. The head unit 104 may then store 906 the information generated in 904 as part of the vehicle-specific information 212. The interest information regarding user interest in fitness, yoga, and/or health may be stored as part of the user information 514. Consequently, when the head unit 104 is selecting one or more content instances, the interest information that is stored based on a previous destination of the vehicle 102 may be considered as part of the selection.

Figure 10:
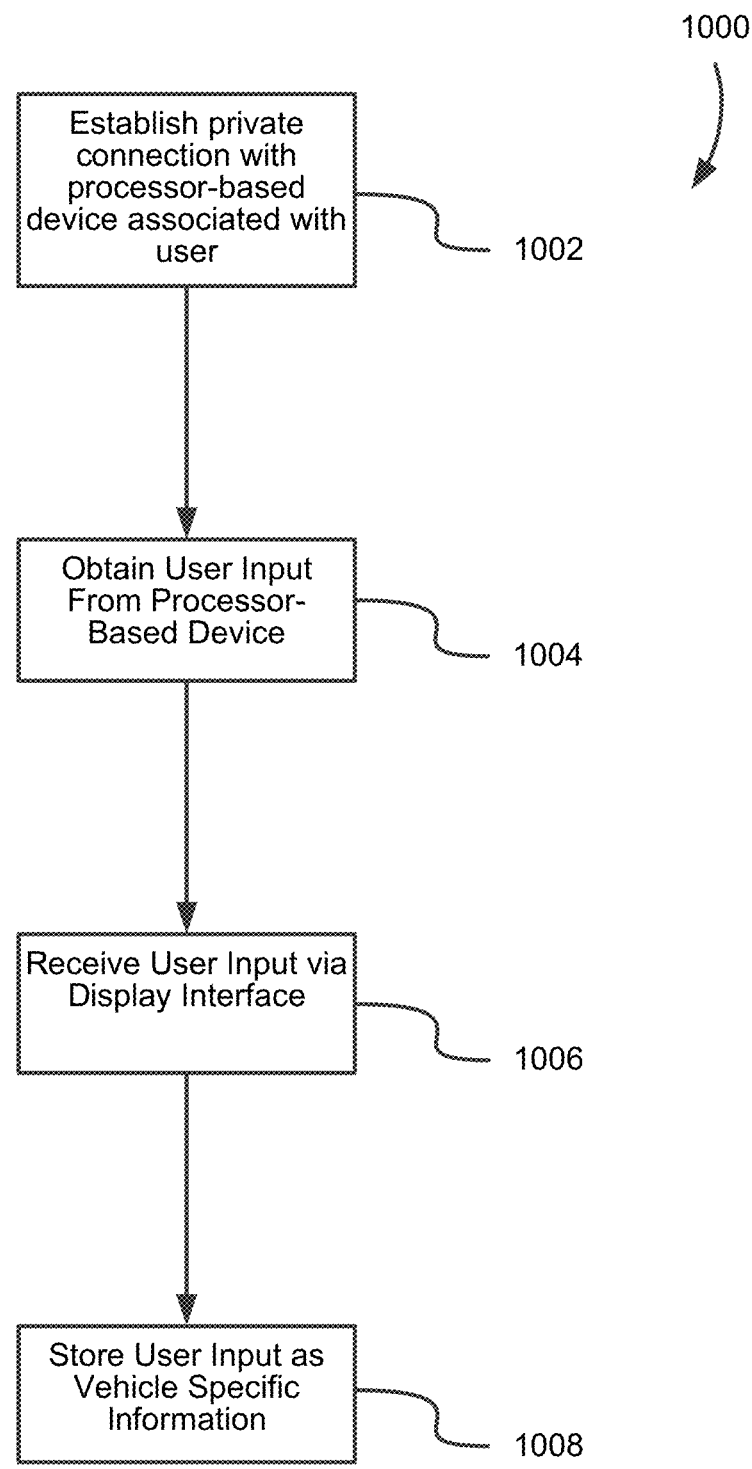
FIG. 10 illustrates a method for storing user-specific input as part of the vehicle-specific information in accordance with embodiments described herein.

FIG. 10 illustrates a method 1000 for storing user-specific input as part of the vehicle-specific information 212 according to one or more embodiments. The method 1000 may optionally begin by establishing 1002 a private connection between the head unit 104 and a processor-based device of the user, such as the mobile device 114. The private connection is a wired or wireless connection established directly between the head unit 104 and the mobile device 114 as a result of a user input to do so. The head unit 104 may then obtain 1004 input including information regarding the user, such as demographic information, from the processor-based device. Such information may be obtained as a result of the user providing user input to a mobile application of the processor-based device for interfacing with the head unit 104, wherein the mobile application causes the user input to be securely transmitted to the head unit 104. As another example, the user-specific input may be obtained from one or more third party applications of the mobile device 114 and transmitted to the head unit 104 as a result of the user providing authorization and input to do so. One or both of obtaining 1004 and receiving 1006 user input may be performed as part of the method 1000. At 1008, the head unit 104 stores the user input obtained 1004 and/or received 1006 as part of the user information 514, included in the vehicle-specific information 212.

Figure 11:
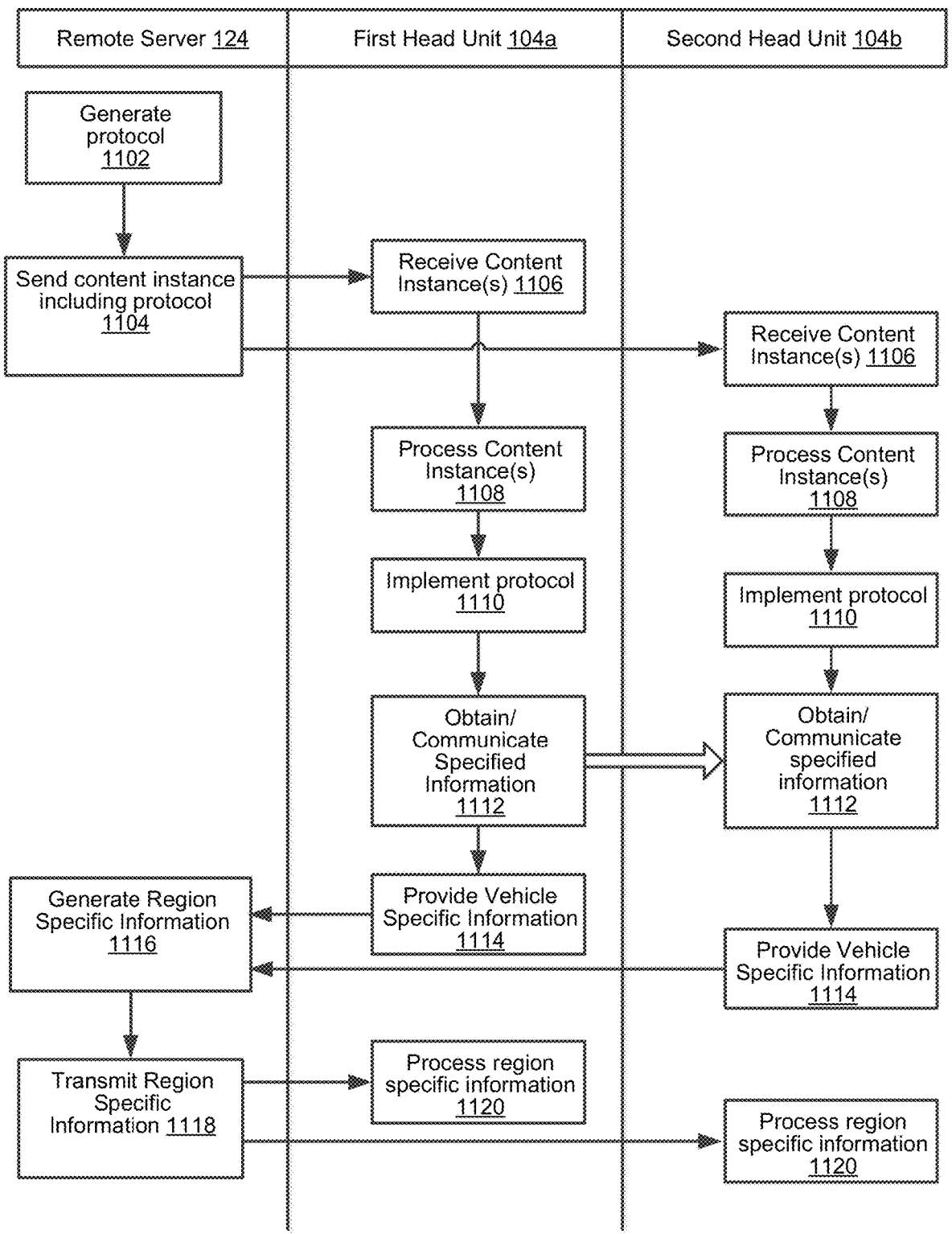
FIG. 11 illustrates a flow diagram in which a remote server exchanges information with head units in the geographic region.

FIG. 11 is a flow diagram 1100 showing a process performed in connection with protocol implementation by the head units 104 according to one or more embodiments. The flow diagram 1100 begins at 1102 wherein the remote server 124 generates a protocol 222 to be distributed to head units 104 within one or more particular geographic regions. The remote server 124 may generate 1102 the protocol 222 as a result of receiving input provided by an authorized user, such as a system administrator, or in response to information received from one or more head units 104 (e.g., accident information, weather information, traffic movement information, etc.). The remote server 124 then sends 1104 a content instance 204 including the protocol 222 generated in 1102 to head units 104 located in the particular geographic region. The content instance 204 may include or otherwise reference the criteria 504 for head units 104 to determine whether to implement the protocol 222. The content instance 204 may include other content, such as media content, to potentially be presented by head units 104, such as being displayed on the display 208 thereof. The content instance 204 may be one of a plurality of content instances 204 sent. Sending 1104 by the remote server 124 may include the remote server 124 causing one or more antennae 202 to transmit the content instance(s) 204 to head units 104 within the particular geographic region.

Head units 104*a* and 104*b* receive 1106 the content instance 204 including the protocol 222 transmitted and process 1108 the received content instances 204 accordingly. In various embodiments, the remote server 124 may broadcast the content instances 204 without specifically identifying the head units 104*a* and 104*b*. Accordingly, the content instances 204 may be received by the head units 104*a* and 104*b* at relatively the same time from the same broadcast. In other embodiments, the remote server 124 may send the content instance 204 over multiple broadcasts such that the head unit 104*a* receives the content instance 204 at a different time than the head unit 104*b*—for example, the head unit 104*a* may receive the content instance 204 at a first time, and the head unit 104*b* may receive the content instance 204 at a second time after the first time. Moreover, the head units 104*a* and 104*b* may perform similar operations at different times. Although two head units 104*a* and 104*b* are depicted and described in connection with the flow diagram 1100, this is provided for ease of illustration and description only. There may be a greater number of head units 104 within the particular geographic region that perform the operations described herein.

The head units 104*a* and 104*b* implement 1110 the protocol 222 included in the content instance 204 received in 1108. For example, the head units 104*a* and 104*b* extract the criteria 504 from the content instance 204 and evaluate the criteria 504 to determine whether to enforce the protocol 222. The criteria 504 may be evaluated based on relevant information obtained by the respective head units 104a and 104b. As an example, the head units 104a and 104b may obtain vehicle-specific information 212 or information regarding operation of the vehicle 102 (e.g., information regarding wheel slippage events) and compare that obtained information with conditions specified in the criteria 504. As a result of determining that the relevant information obtained satisfies the criteria 504, the head units 104a and 104b may initiate the protocol 222.

Enforcement of the protocol 222 may cause the head units 104a and 104b to adjust or modify their respective operation. As one example, enforcement of the protocol 222 may cause the head units 104a and 104b to obtain certain information, such as vehicle-specific information 212 stored in the memory 210, information regarding operations of the vehicles 102 (e.g., speed, wheel slip events, foreign objects detected in road), or information regarding the environment (e.g., ambient temperature, precipitation detected). The information obtained may be useable to determine whether hazardous conditions or heavy traffic conditions are present within the particular geographic region. As another example, enforcement of the protocol 222 may cause the head units 104a and 104b to communicate 1112 with each other. The communications 1112 may contain certain information obtained or specified in the protocol 222. As an example, the communications 1112 are via the communication connections 604 or ad hoc network 606 discussed above with respect to FIG. 6.

As an example, the information communicated may help the other head unit 104 to perform operations according to the protocol 222 that reduce driver distraction, reduce likelihood of accident, or improve navigation to a destination. In some instances, the protocol 222 may affect operation of the head units 104a and 104b in other ways, such as by causing the head units 104a and 104b to adjust presentation of media content by the head units 104a and 104b or causing the head units 104a and 104b to control certain aspects of vehicle 102 operation.

In 1114, the head units 104a and 104b can provide 1114 the information obtained in 1112 to the remote server 124 in accordance with the protocol 222 being enforced. As an example, the information may include the location of the head unit 104 within the particular geographic region and at least some of the vehicle-specific information 212. The information may be transmitted over the mobile device communication network 120, the communication network 122, or some other network exclusive to the ad hoc network 606 or the communication connections 604. The remote server 124 may process the information received and generate region-specific information 1116. For example, the remote server 124 may generate, using the information received from the head units 104a and 104b, a real-time map indicating traffic conditions or hazardous road conditions in the particular geographic region 602. The map may be generated using time information and the location information of the head units 104a and 104b. As a result, the map may indicate events or conditions that may interest the users of other vehicles in the geographic region 602.

In some cases, the granularity of the locations of the vehicles providing such data to the remote server 124 (or each other) may be sufficient to enable identification of specific lanes of a road that are affected by the event or condition. As one example, the region-specific information may indicate that a collision or black ice is detected in a particular lane. In some instances, the remote server 124 may generate another protocol 222 for enforcement in connection with the region-specific information within the particular geographic region 602.

The remote server 124 may cause the region-specific information to be transmitted 1118 to the head units 104a and 104b located in the geographic region 602. The region-specific information may be included in or with one or more content instances 204 transmitted by one or more antennae 202. The head units 104a and 104b may then process 1120 the region-specific information received, which may include performing a set of operations. The head units 104a and 104b may present a map to a user indicating conditions detected in the geographic region 602 relative to the vehicle 102 in which the respective head unit 104 is located. For example, the head units 104a and 104b may present an indication alerting the driver that a hazardous condition is detected ahead in the driver's lane, traffic in the driver's lane is merging into another lane, or slowdown conditions are detected ahead. The head units 104a and 104b may affect operation of their respective vehicles 102 in some instances to improve safety or reduce the likelihood of collision, such as by automatically transitioning the vehicle 102 into a four-wheel drive mode in response to determining that the region-specific information indicates the presence of icy or wet conditions ahead.

Figure 12:
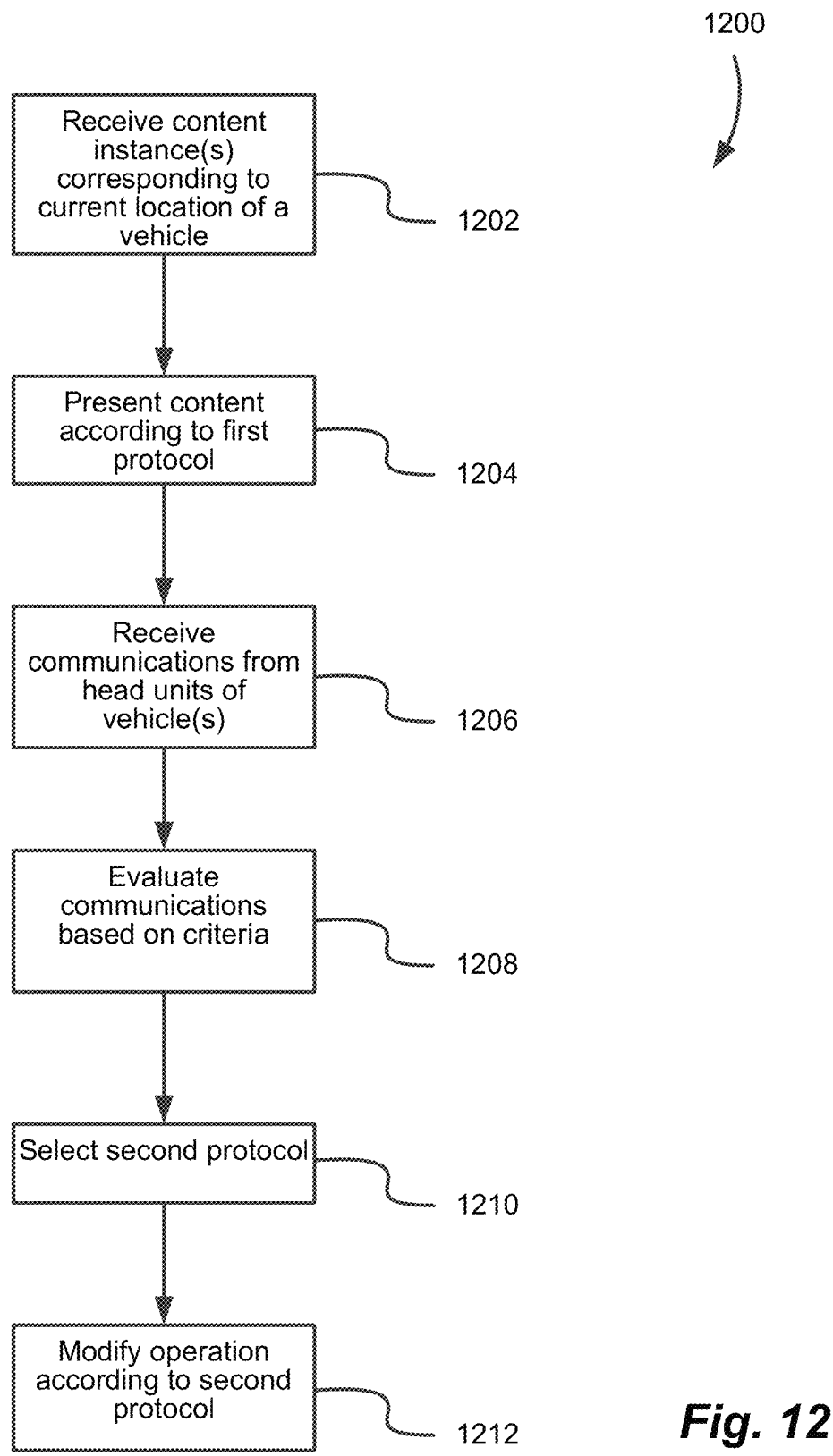
FIG. 12 illustrates a method for enforcing protocols by a head unit.

FIG. 12 shows a method 1200 for operating a head unit 104 according to one or more embodiments described herein. The method 1200 begins by receiving 1202 a content instance 204 corresponding to the particular geographic region 602 in which the vehicle 102 corresponding to the head unit 104 is located. The content instance 204 received includes or is associated with a protocol 222 and criteria 504 for determining whether the head unit 104 should enforce the protocol 222. The content instance 204 may be one of a plurality of content instances 204 received.

The method 1200 proceeds by presenting 1204 content according to a first protocol being enforced. Presenting 1204 the content may include displaying visual content on the display 208 or playing audio content over a speaker or other device communicatively connected to the head unit 104. The content may be included in the content instance received in 1202. In some implementations, the first protocol may be a default protocol being enforced by the head unit 104 for presenting media content. As a result, the first protocol may not produce any constraints on the head unit 104 to present media content, and the head unit 104 presents the content in a regular or normal manner. In some implementations, the first protocol may be a protocol included or associated with the content instance(s) received in 1202. The first protocol may dictate presentation of media instances received by the head unit 104.

The method 1200 includes receiving 1206 communications from head units 104 of other vehicles 102. The communications are received via the communication connections 604 described above with respect to FIG. 6. The communications may include information specific to the other vehicle 102, such as information regarding operation of the other vehicle 102. For example, the communication may indicate the occurrence of wheel slippage at a location in the geographic region 602 or speed of the vehicle 102 at one or more locations in the geographic region 602. The other vehicle 102 may send the communication as a result of initiating a particular protocol 222 and in response to detection of certain events. Receiving 1206 may include receiving a plurality of communications from a plurality of other vehicles 102 located in the geographic region 602.

The method 1200 includes evaluating 1208 the communications received in 1206 based on a set of criteria 504. The criteria 504 is associated with a second protocol and specifies one or more conditions for determining whether to enforce the second protocol. In particular, the criteria 504 specifies conditions for evaluating whether to enforce the second protocol based on the communications received in 1206. For example, the criteria 504 may specify conditions regarding a density or number or density of communications received from other head units 104 or communication connections 604 established with other head units 104 in a given time period in the geographic region 602, which could indicate the density of vehicles 102 therein. The criteria 504 may specify a threshold condition that, if met, would cause the head unit 104 to initiate the corresponding second protocol. In some embodiments, the criteria 504 may specify that a predetermined number or type of communication connections 604 from other head units 104 meets (or exceeds) a value defined in the criteria 504. These conditions may indicate heavy traffic conditions detected near or around the vehicle 102.

As a further example, the criteria 504 may specify conditions regarding content of the communications received in 1206. For example, the criteria 504 may specify conditions regarding the receipt of communications indicating the occurrence of wheel slippage events or a sudden slowdown event. The criteria 504 may specify that the corresponding second protocol should be enforced as a result of receiving communications satisfying the criteria 504.

The second protocol and the associated criteria 504 may have been received by the head unit 104 in a content instance 204 received for the geographic region 602. The second protocol and criteria 504 may have been received at 1202 with the content instance(s) 204, for example. In some cases, the second protocol and criteria 504 may have been received as a content instance 204 after 1202 by itself or along with a plurality of content instances 204.

As a result of determining that the communications received in 1206 satisfy the criteria 504 associated with the second protocol, the method 1200 includes selecting 1210 the second protocol. Selecting 1210 the second protocol includes initiating the second protocol. Next, the method 1200 includes modifying 1212 operation according to the second protocol. Modifying 1212 operation may include modifying presentation of content by the head unit 104. The head unit 104 may adjust how media content is displayed by, e.g., making the media content less prominent on the display 208, presenting less distracting media content (e.g., non-moving media content), or ceasing presentation of media content, while the protocol is in effect. This helps to reduce potential distractions to users.

The modifying 1212 operation may include the head unit 104 causing modification to operation of the vehicle 102 according to the second protocol. The head unit 104, for example, may communicate with other systems of the vehicle, such as an electronic control unit, to modify the operation or performance of the vehicle 102. The head unit 104 may implement measures that improve safety, such as by moderating the speed of the vehicle 102, transitioning the vehicle 102 into a different mode (e.g., four-wheel drive), or regulating space between adjacent vehicles 102. The operations described with respect to FIG. 12 may be performed in a different order than described.

Figure 13:
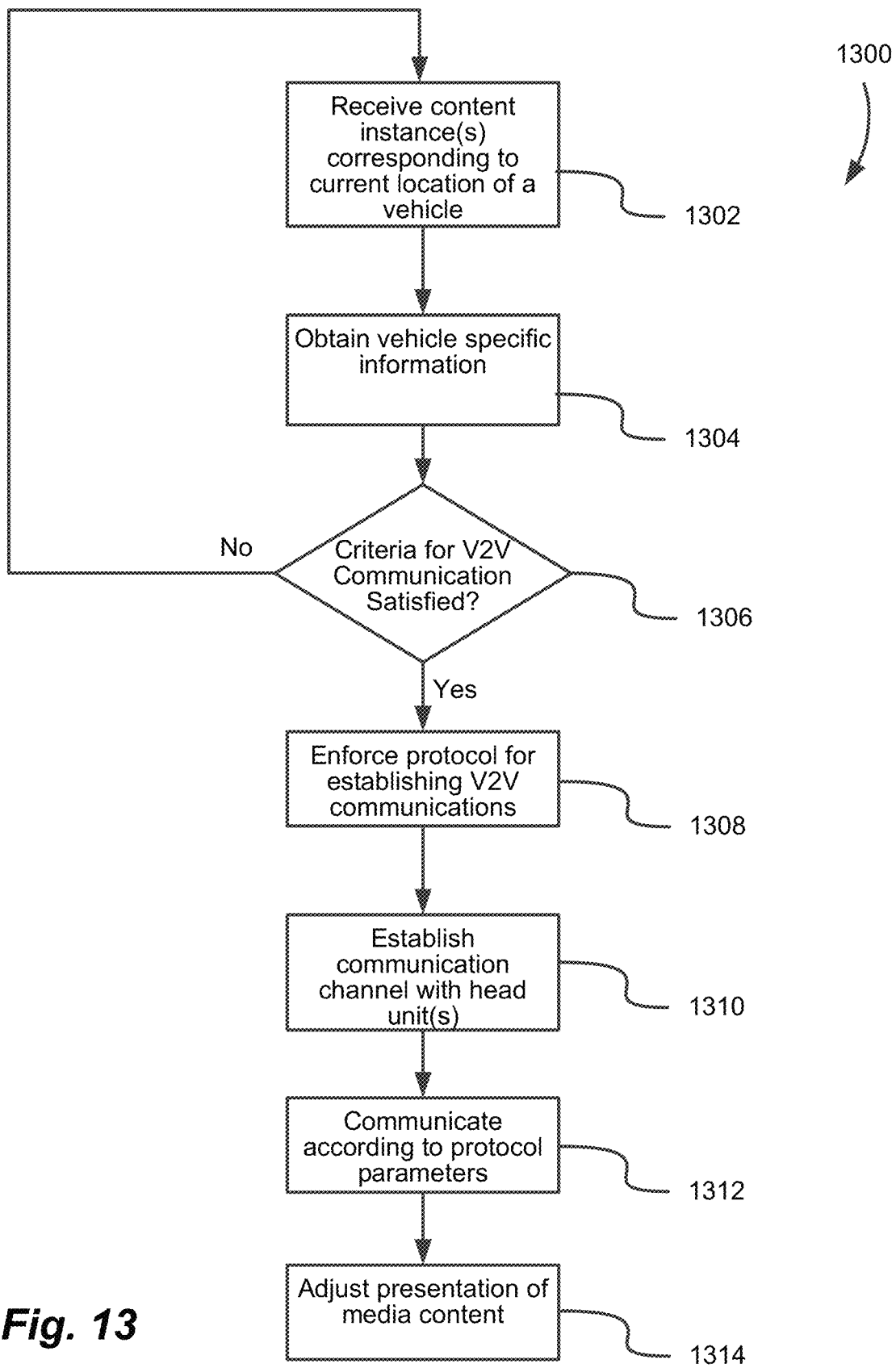
FIG. 13 illustrates a method for enforcing protocols based on communications between head units.

FIG. 13 shows a method 1300 for causing a head unit 104 to initiate communications with another head unit 104 in a geographic region 602 according to one or more embodiments described herein. The method 1300 begins by receiving 1302 a content instance 204 corresponding to the particular geographic region 602. The content instance 204 received in 1302 includes a protocol 222 for establishing a communication connection 604 with other head units 104 in the geographic region 602. The content instance 204 may include criteria 504 for evaluating whether to enforce the protocol 222.

The head unit 104 may then obtain 1304 vehicle-specific information 212 to determine whether to enforce the protocol 222. The head unit 104 may obtain certain vehicle-specific information 212 stored in the memory 210 or obtain measurements or other current information regarding the vehicle 102 (e.g., speed, specific location within geographic region 602). The method 1300 proceeds by determining 1306 whether the criteria 504 for enforcing the protocol 222 is satisfied. Determining 1306 whether the criteria 504 is satisfied may include performing a comparison between the vehicle-specific information obtained with conditions specified. If the vehicle-specific information 212 does not satisfy the criteria 504, the head unit 104 does not enforce the protocol 222 and returns to begin waiting to receive further content instances 204.

If the vehicle-specific information 212 satisfies the criteria 504, the head unit 104 proceeds to enforce 1308 the associated protocol 222. The protocol 222 in this case specifies actions or operations for vehicle-to-vehicle communications. In particular, the protocol 222 instructs the head unit 104 to establish 1310 communication channels 604 with head units 104 within the geographic region 602, as discussed above with respect to FIG. 6. The method 1300 includes communicating 1312 according to the protocol 222 being enforced. That is, the head units 104 may transmit vehicle-specific information 212 to other head units 104 indicating information regarding vehicle operations and events and conditions detected. Communicating 1312 also includes receiving communications from other head units 104 indicating information regarding other vehicles 102.

The method 1300 includes adjusting 1314, based on the communications in 1312, presentation of media content by the head unit 104. Adjusting 1314 presentation of the media content may include adjusting how media content is presented by presenting media content in a different area in the display 208 (e.g., passenger side area), reducing the size of a presentation area, reducing an amount of time the media content is presented, or reducing brightness or adjusting color output of the display 208, by way of example. In some instances, the protocol 222 may cause the head unit 104 to adjust 1314 by moderating what media content is displayed. Adjusting 1314 according to the protocol 222 being enforced may include presenting media having certain characteristics (e.g., content without audio, static content).

Each of the methods 700, 800, 900, 1000, 1200, 1300, or the flow diagram 1100 is not limited to its corresponding chronological order presented here. Moreover, each method 700, 800, 900 1000, 1200, 1300, or the flow diagram 1100 may include additional or even fewer steps than those illustrated in the associated figures.

Other configurations or examples may apply to the subject matter described herein. For example, the content instances 204 may be delivered to the vehicle 102 through a hardwired connection, which may be present when the vehicle 102 is undergoing repairs or is being refueled or charged. In addition, the content instances 204 may be streamed to the head unit 104, as opposed to being stored in the memory 210, and presented as part of an existing source of streamed content (like music) or independent of any other content. Moreover, data related to the user's interactions with content instances 204 that are presented may be collected and delivered to a remote facility. In such a case, the remote facility may include servers loaded with machine learning (ML) models, which may be trained using the collected data. These ML models may then be used to adjust the content, delivery, or presentation of the content instances 204 or modify the process of comparing the target vehicle criteria 205 with the vehicle-specific information 212.

In addition, although many of the processes described above are performed or managed by a head unit, any other computer that can present content or cause it to be presented to a user of a vehicle can be configured to do the same. Such a computer may be entirely contained within or on the vehicle, or part of it may be remote to the vehicle. Moreover, this computer may be a single computer or can be comprised of multiple computers. The computer can also be configured to perform or manage these processes alone or in combination with other systems or networks.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A head unit of a vehicle, comprising:
a first communication interface;
a second communication interface;
a display device that is configured to present content;
memory that is configured to store computer instructions; and
one or more processors that are configured to execute the computer instructions to:
 receive, while the vehicle is in a defined geographic area, the content, a first protocol, and a second protocol over a network via the first communication interface, wherein the first protocol and the second protocol indicate how the content is to be presented on the display device;
 present the content to a user via the display device according to the first protocol received while the vehicle is in the defined geographic area;
 receive communications from a second head unit of a second vehicle via the second communication interface;
 select the second protocol based on an evaluation of the communications from the second head unit; and
 modify presentation of the content on the display device according to the second protocol received while the vehicle is in the defined geographic area.

2. The head unit of claim 1, wherein the one or more processors are configured to execute further computer instructions to:
receive, over the network via the first communication interface, a content instance that includes the second protocol and a set of criteria for evaluating the communications from the second head unit to determine whether to enforce the second protocol, wherein the second protocol is selected based on a determination that the communications satisfy the set of criteria.

3. The head unit of claim 2, wherein the set of criteria includes a criterion regarding a number of occurrences of defined vehicle operations of a plurality of vehicles that is determined based on communications received from head units of the plurality of vehicles.

4. The head unit of claim 2, wherein the set of criteria includes a criterion regarding performance of the vehicle to be evaluated based on information received over the first communication interface that is indicative of vehicle operations.

5. The head unit of claim 2, wherein the set of criteria includes a criterion regarding an amount of communications between the second communication interface and the second head unit of the second vehicle.

6. The head unit of claim 2, wherein enforcement of the second protocol causes the one or more processors to reduce distractions associated with the presentation of the content on the display device.

7. The head unit of claim 2, wherein enforcement of the second protocol causes the one or more processors to select the content to present on the display device.

8. The head unit of claim 2, wherein the one or more processors are configured to execute further computer instructions to:
implement safety measures affecting performance of the vehicle during enforcement of the second protocol.

9. The head unit of claim 1, wherein the one or more processors are configured to execute further computer instructions to:
establish an ad hoc connection with the second head unit of the second vehicle via the second communication interface, wherein the communications from the second vehicle are received over the ad hoc connection.

10. A computer-implemented method, comprising:
receiving, by a first head unit of a first vehicle over a network, a content object corresponding to a geographic region in which the first vehicle is operating without previously transmitting a request for the content object, wherein the content object includes a protocol;
obtaining, by the first head unit from a memory on the first vehicle, information specific to the first vehicle;
enforcing, by the first head unit, the protocol included in the content object based on an evaluation of the information specific to the first vehicle and a set of criteria associated with the content object;
establishing, by the first head unit, a communication channel with a second head unit of a second vehicle according to the protocol; and
adjusting, by the first head unit, content presentation on a display of the first vehicle according to the protocol based on an evaluation of communications received over the communication channel.

11. The computer-implemented method of claim 10, further comprising:
transmitting, by the first head unit, a communication that includes content specified in the protocol to the second head unit of the second vehicle over the communication channel in accordance with the protocol.

12. The computer-implemented method of claim 11, wherein the content of the communication to be transmitted includes information regarding operation of the first vehicle.

13. The computer-implemented method of claim 10, further comprising:
receiving, by the first head unit, a communication from the second head unit of the second vehicle over the communication channel that includes information regarding operation of the second vehicle; and
determining that the communication from the second head unit satisfies a criterion of the set of criteria, wherein adjusting the content presentation on the display is in response to determining that the communication from the second head unit satisfies the criterion.

14. The computer-implemented method of claim 10, further comprising:
receiving, by the first head unit over the network, a plurality of content objects that correspond to the geographic region of the first vehicle and that include the content object and a second content object including media content;
selecting, by the first head unit, the content object as a result of the evaluation of the information specific to the vehicle and the set of criteria; and
presenting the content object on the display.

15. The computer-implemented method of claim 10, further comprising:
causing, by the first head unit, the first vehicle to operate according to parameters defined in the protocol based on content of the communications received.

16. A system, comprising:
a memory that is configured to store computer instructions; and
one or more processors that are configured to execute the computer instructions to:
generate a protocol configured to affect operation of head units of vehicles located in a defined geographic region;
cause transmission of the protocol to the head units of the vehicles currently located in the defined geographic region;
receive vehicle-specific information from a subset of the head units of the vehicles located in the defined geographic region in accordance with the protocol;
generate a content instance including condition information indicating conditions at locations in the defined geographic region based on the vehicle-specific information; and
cause transmission of the content instance to the head units of the vehicles located in the defined geographic region.

17. The system of claim 16, wherein the one or more processors are configured to execute further computer instructions to:
generate a plurality of content instances that include the protocol and a media instance; and
cause transmission of the plurality of content instances to the head units of the vehicles currently located in the defined geographic region.

18. The system of claim 16, wherein the protocol is configured to cause the head units of the vehicles to, as a result of being enforced, collect information regarding one or more of sudden stop events, vehicle speed, or wheel slippage events associated with the vehicles.

19. The system of claim 16, wherein the protocol includes a set of criteria and instructions that are configured to cause the head units to enforce the protocol as a result of a determination that the set of criteria is satisfied.

20. The system of claim 16, wherein the protocol or the content instance specifies a second protocol that is configured to cause the subset of the head units to establish an ad hoc network between two or more head units of the subset of head units.

21. The system of claim 16, wherein the protocol includes instructions that are configured to cause the head units to adjust presentation of media content based on the condition information.

* * * * *